United States Patent [19]

Takahashi et al.

[11] Patent Number: 5,567,539
[45] Date of Patent: Oct. 22, 1996

[54] NON-AQUEOUS SECONDARY CELL

[75] Inventors: Osamu Takahashi; Mitsutoshi Tanaka, both of Minami-Ashigara, Japan

[73] Assignee: Fuji Photo Film Co., Ltd., Kangawa, Japan

[21] Appl. No.: 445,416

[22] Filed: May 19, 1995

[30] Foreign Application Priority Data

| May 23, 1994 | [JP] | Japan | 6-108287 |
| Sep. 29, 1994 | [JP] | Japan | 6-235244 |

[51] Int. Cl.⁶ .................................................. H01M 2/12
[52] U.S. Cl. ............................ 429/57; 429/59; 429/218
[58] Field of Search ................................. 429/53, 54, 56, 429/57, 59, 60, 61, 218

[56] References Cited

U.S. PATENT DOCUMENTS

| 3,081,366 | 3/1963 | Belove . | |
| 4,028,478 | 6/1977 | Tucholski . | |
| 4,855,195 | 8/1989 | Georgopoulos et al. | 429/54 |
| 4,913,988 | 4/1990 | Langan | 429/194 |
| 4,943,497 | 7/1990 | Oishi et al. | 429/53 |
| 4,992,339 | 2/1991 | Georgopoulos . | |
| 5,057,382 | 10/1991 | Tucholski . | |
| 5,208,122 | 5/1993 | Hirakawa et al. | 429/222 |
| 5,278,001 | 1/1994 | Ono et al. | 429/101 |
| 5,376,467 | 12/1994 | Abe et al. . | |

FOREIGN PATENT DOCUMENTS

| 0110344 | 6/1984 | European Pat. Off. . |
| 0536425 | 4/1993 | European Pat. Off. . |
| 5-159762 | 6/1993 | Japan . |
| 5-347154 | 12/1993 | Japan . |
| 6-231743 | 8/1994 | Japan . |
| 6-096803 | 4/1995 | Japan . |
| 6-124695 | 6/1995 | Japan . |
| 7169457 | 7/1995 | Japan . |

OTHER PUBLICATIONS

Chemical Abstracts, vol. 123, No. 14, Oct. 2, 1995; Columbus, OH US; Abstract No. 175031, Nagaura Tooru "Secondary batteries with spinel–structured lithium manganese oxide cathodes".

Primary Examiner—Stephen Kalafut
Assistant Examiner—Richard H. Lilley, Jr.
Attorney, Agent, or Firm—Sughrue, Mion, Zinn, Macpeak & Seas

[57] ABSTRACT

An enclosed non-aqueous secondary cell is herein disclosed, in which a group of electrodes comprising positive and negative electrodes allowing absorption and release of a light metal and separators are accommodated in a closed-end cell-armoring can together with a non-aqueous electrolyte and an opening of the armoring can is closed by an insulating gasket positioned around the inner periphery of the opening of the can and a closing lid fitted in and supported by the gasket and simultaneously serving as a positive or negative terminal, wherein the closing lid comprises an explosion-proof valve capable of deforming towards the direction opposite to the group of electrodes in response to an increase in the internal pressure of the cell, a terminal cap provided with vent holes and arranged at the side of the explosion-proof valve opposed to the group of electrodes and a non-reverse type switch which is positioned between the explosion-proof valve and the terminal cap and serves to shut-off the electrical connection between the terminal cap and the positive or negative electrode when the temperature of the cell is raised or the pressure in the cell is increased. The foregoing cell construction permits shutting off of the electrical connections within the cell when the temperature and/or internal pressure thereof increase.

10 Claims, 8 Drawing Sheets

NON-AQUEOUS SECONDARY CELL

BACKGROUND OF THE INVENTION

The present invention relates to an enclosed non-aqueous secondary cell capable of shutting-off the electrical connections within the cell when the temperature and/or internal pressure thereof increase and more particularly to an explosion-proof valve structure used in the non-aqueous secondary cell.

The recent progress in high quality, small-sized and/or portable electronic apparatuses has required the use of a secondary cell having a high energy density, as a power supply means for these electronic apparatuses, instead of the conventional cells such as nickel-cadmium cells and lead storage batteries. Under such circumstances, there have recently been investigated and developed nickel-hydrogen cells which make use of hydrogen absorbing alloys as negative electrode materials and non-aqueous secondary cells which make use of substances capable of absorption and release of a light metal as positive and negative electrode materials, and such cells have already been used in some of these electronic apparatuses. In particular, an enclosed non-aqueous secondary cell which makes use of electrodes capable of absorbing and releasing lithium has a high cell voltage on the order of 3.6 V and a high energy density. Therefore, the size and weight thereof can be reduced. Moreover, the enclosed non-aqueous secondary cell has a low degree of self-discharge and is excellent in cycle life and thus it would be presumed that such a cell is widely used, for the future, as a power source for portable machinery and tools.

In a non-aqueous secondary cell, the cell voltage abnormally increases if a current greater than a predetermined level flows through the cell for some reasons during charging and the internal pressure in the cell correspondingly increases due to decomposition of the electrolyte, i.e., a gas-generation reaction. Moreover, if the overcharge condition is further continued, the rate of the decomposition reaction is accelerated and this leads to an abrupt increase in the cell temperature and in the internal pressure thereof and the cell is finally damaged. Japanese Un-examined Patent Publication (hereunder referred to as "J.P. KOKAI") No. Hei 2-112151 discloses a non-aqueous secondary cell provided with a current-cutoff means which can operate in response to an increase in the internal pressure in the cell as a measure for ensuring safety during such overcharge.

In general, the enclosed secondary cell also causes an increase in the temperature thereof upon formation of a short circuit and/or during overcharge and this, in turn, results in evaporation of the electrolyte accommodated in the cell and hence an increase in the internal pressure thereof. If this condition lasts over a long period of time, the internal pressure of the cell continuously increases, the cell would finally be exploded and tile peripheral devices are correspondingly damaged. For this reason, the cell of this type is equipped with an explosion-proof valve which can externally discharge gases generated within the cell at an instance when the internal pressure of the cell arrives at a predetermined level.

The enclosed non-aqueous secondary cell is likewise provided with an explosion-proof valve, but it has recently been found that although the explosion-proof valve is actuated at a predetermined internal pressure of the cell to externally discharge the gases generated within the cell, the cell temperature still continues increasing and the cell is finally exploded, in particular, during overcharge. It is assumed that this is caused for the following reason. The current continues to flow even after the discharge of gases, the cell temperature correspondingly continues to increase simultaneously with an increase in the internal pressure of the cell, this results in an abnormal reaction such as abrupt decomposition of the electrolyte and active materials and accordingly, the cell causes an abrupt temperature raise.

The cell disclosed in J.P. KOKAI No. Hei 2-112151 comprises, as shown in FIG. 14, an explosion-proof valve 6 having, at the central portion thereof, a projected part protruding towards the side of an electrode group; an insulating stripper 15 having, at the central part thereof, a through hole for passing the projected portion of the valve 6 and positioned in such a manner that the stripper 15 comes in contact with the back face of the valve 6; and a lead plate 4 extended from one of electrode plates of the electrode group and welded to the lower face of the projected portion so as to bridge the gap between the back face of the stripper 15 and the lower face of the projection of the valve 6, which are arranged at a closing lid portion. In this case, if the internal pressure of the cell begins to increase due to, for instance, overcharge and/or formation of a short circuit, the explosion-proof valve 6 causes deformation towards the side opposite to the electrode group and the lead plate 4 welded to the projected portion of the valve 6 is simultaneously peeled off and/or broken at the welded portion in response to the deformation of the explosion-proof valve. Thus, the current path is cut off and the worst case, i.e., explosion of the cell can be prevented before it happens.

First of all, however, when the explosion-proof valve 6 is deformed towards the side opposite to the electrode group in the cell disclosed in the foregoing patent, the lead plate 4 is pulled into the through hole of the insulating stripper 15 and the current path is not always cut off with certainty. Secondly, the lead plate 4 in a floating state may come in contact with the inner wall of an armoring can and may sometimes form a short circuit even if the lead plate 4 is peeled off from the explosion-proof valve 6 and/or broken. Thirdly, the precision of the cutoff of the current path by the explosion-proof valve 6 is greatly affected by that of the weld strength or breaking strength of the lead plate 4 and further the foregoing welded portions are exposed to an electrolyte atmosphere at the side of the electrode group in this structure. Therefore, the foregoing strength is influenced by, for instance, corrosion of the welded portion with time, accordingly the current path is often cut off even when the cell is simply dropped or by a vibrational action or the current path is not cut off even when the internal pressure abnormally increases and correspondingly, the cell is often exploded. Fourthly, the lead plate 4 is welded to the projection of the explosion-proof valve 6, a pinhole is sometimes formed due to insufficient welding and in such a case, the current path cannot be cut off since the explosion-proof valve 6 does not cause deformation even when the internal pressure of the cell increases.

In addition, the cell disclosed in Japanese Un-examined Utility Model Publication No. Hei 5-62956 comprises, as shown in FIG. 15, an explosion-proof valve 6 called rupture disc having, at the central part thereof, a dome-like projection protruding towards the side of a group of electrodes and a lead plate 4 extended from one of electrode plates of the electrode group and electrically connected to the projected portion of the valve 6 at a closing lid portion. In this cell, when the internal pressure begins to increase, the dome-like projection of the valve reverses in the direction opposite to the electrode group and causes considerable deformation. At the same time, the electrical connection between the valve 6 and the lead plate 4 is disconnected and thus the current path is also cut off. In addition, the dome-like projection is partially broken and the gas generated within the cell is accordingly discharged from the cell.

Further the cell disclosed in J.P. KOKAI No. Hei 5-343043 has a structure approximately identical to that disclosed in J.P. KOKAI No. Hei 2-112151, but a metal thin plate or a metal disc 16 lies between a projected portion of an explosion-proof valve 6 and a lead plate 4 as shown in FIG. 16. This cell is designed in such a manner that when the internal pressure of the cell increases, the connection between the projected portion of the valve 6 and the metal thin plate or metal disc 16 is disconnected and the current path is thus cut off.

As will be seen from FIG. 17, the cell disclosed in J.P. KOKAI No. Hei 5-347154 comprises, at a closing lid portion, an explosion-proof valve 6; a metal disc 17 welded to the portion of the valve which causes deformation when the internal pressure of the cell increases from the side of a group of electrodes; a lead plate 4 extended from one of electrode plates of the electrode group and electrically connected to the metal disc 17 on the side facing the electrode group; and a working plate 18 pressed against the explosion-proof valve 6 on the side opposed to the electrode group. In this cell, when the internal pressure of the cell increases due to, for instance, overcharge or short, the explosion-proof valve 6 causes deformation towards the direction opposite to the electrode group while pushing the working plate 18 up, the welded portion between the valve 6 and the metal disc 17 is peeled off and the current path is thus cut off.

As will be seen from FIG. 18, the cell disclosed in J.P. KOKAI No. Hei 5-205727 comprises, at a closing lid portion, a bimetal 19 fitted to the outer periphery of a cap which also serves as a positive or negative electrode; a closing plate electrically connected to the bimetal in the usual condition; and a lead plate 4 extended from one of electrode plates of a group of electrodes and connected to the closing plate on the side facing the electrode group. In this case, when the cell temperature begins to increase due to, for instance, short, the bimetal is put in operation so that the current path is cut off at the connection between the bimetal and the closing plate and thus any abnormal overheating of the cell can be prevented. Moreover, when the cell temperature returns to a normal level, the bimetal recovers its normal state and the current path is correspondingly recovered. Thus, the cell can again be used in the normal condition.

This cell is safe when the cell temperature is raised due to short, but is not necessarily safe when the cell is overcharged. More specifically, the cell voltage gradually increases during repeating the operation and reverse of the bimetal since the cell is reverse type one. In this case, the cell may sometimes be exploded as has been discussed above.

In addition, a method in which lithium carbonate is incorporated into a positive electrode in an amount ranging from 0.5 to 15% by weight has been developed as a measure for sufficiently increasing the internal pressure of a cell during overcharge to thus ensure the function of the foregoing current-cutoff means (J.P. KOKAI No. Hei 4-328278).

Incidentally, recent cordless apparatuses have been required to have a rapid charging ability as a means for improving the handling properties thereof. The rapid charging ability of these cordless apparatuses in turn requires the development of a cell to be installed therein which can be charged within a short time period on the order of one hour or 30 minutes. For this reason, the cell to be installed in these apparatuses must be charged at a high charging current without any trouble. In particular, the charging current increases in proportion to the capacity of cells to be charged. Regarding the overcharge, therefore, a countermeasure should be prepared for large current overcharge. To increase the amount of lithium carbonate to be incorporated into the positive electrode is apt to inhibit damage of cells during overcharge with a high charging current, but it has been found that malfunction such as breakage of a positive electrode during charging or production of a cell occurs when the added amount thereof is not less than 6% by weight and therefore, it is difficult to ensure safety during overcharge at a high charging current, simply by addition of lithium carbonate.

SUMMARY OF THE INVENTION

The present invention has been developed in the light of the foregoing situation of the conventional cells and accordingly, it is an object of the present invention to provide an enclosed non-aqueous secondary cell which can completely shut off the electric connection within the cell at the initial stage of an increase in the cell temperature or the internal pressure of the cell even when abnormality such as overcharge or short is caused.

Another object of the present invention is to provide an improved non-aqueous secondary cell provided with a current-cutoff means which can operate in response to an increase of the internal pressure of the cell.

According to the present invention, the foregoing object of the present invention can be accomplished by providing an enclosed non-aqueous secondary cell in which a group of electrodes comprising positive and negative electrodes allowing absorption and release of a light metal and separators are accommodated in a closed-end cell-armoring can together with a non-aqueous electrolyte and an opening of the armoring can is closed by an insulating gasket positioned around the inner periphery of the opening of the can and a closing lid fitted in and supported by the gasket and simultaneously serving as a positive or negative terminal, wherein the closing lid comprises an explosion-proof valve capable of deforming towards the direction opposite to the group of electrodes in response to an increase in the internal pressure of the cell, a terminal cap provided with vent holes and arranged at the side of the explosion-proof valve opposed to the group of electrodes and a non-reverse type switch which is positioned between the explosion-proof valve and the terminal cap and serves to shut-off the electrical connection between the terminal cap and the positive or negative electrode when the temperature of the cell is raised or the internal pressure of the cell is increased.

The current-cutoff effect of the present invention can be further improved through the use of the positive electrode active material in combination with sodium and/or potassium and/or rubidium and/or magnesium and/or calcium and/or barium salts of carbonic acid.

DESCRIPTION OF THE PREFERRED EMBODIMENTS

Figure 1:
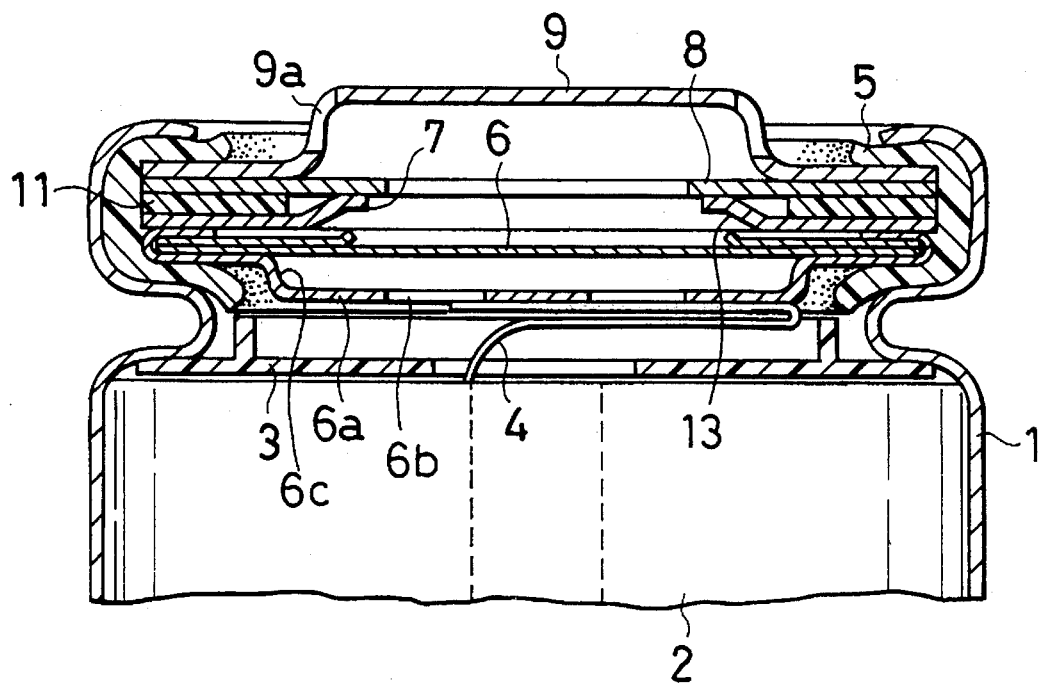
FIG. 1 is a vertical cross sectional view schematically showing the principal part of an embodiment (Cell 1) of the enclosed type non-aqueous secondary cell according to the present invention.
Figure 2:
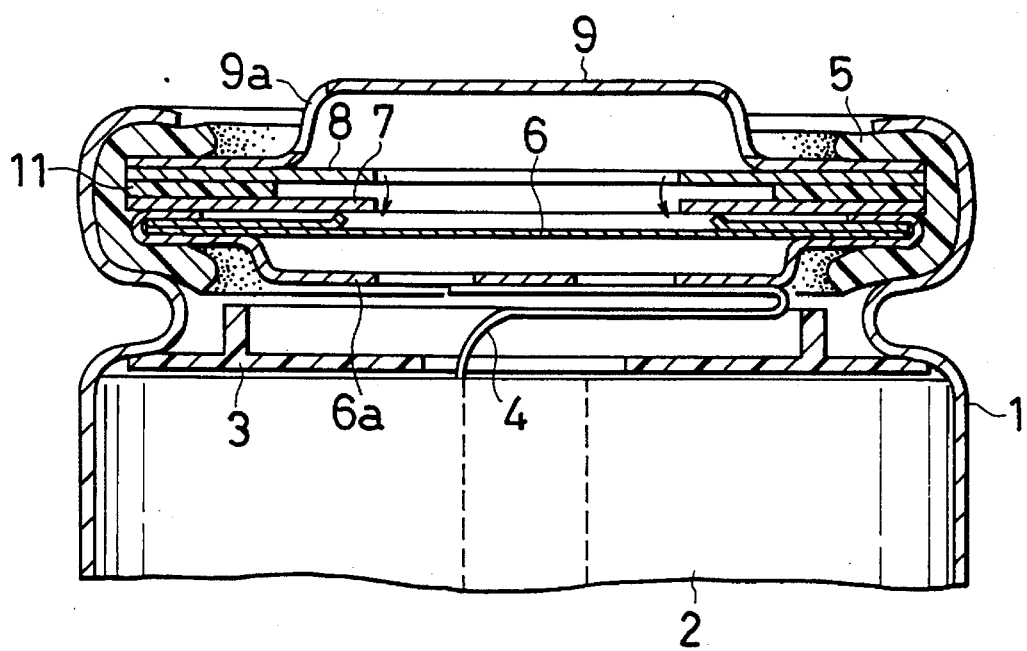
FIG. 2 is a vertical cross sectional view schematically showing the principal part of the embodiment of the enclosed type non-aqueous secondary cell shown in FIG. 1, in the current-cutoff state.

The present invention will hereunder be described in more detail.

The non-reverse type switch usable in the present invention may be any switch which is physically and electrically connected in the usual condition, while it cuts off the electrical connection through the physical disconnection thereof in its operating condition and does not return to its original condition. Specific examples thereof are those having contact type electrical connection systems in which the connected portion is separated in its operating condition; those having welded type electrical connection systems in which the welded portion is broken or peeled off in its operating condition; those having caulking type electrical connection systems in which the caulked portion is broken in its operating condition; or those comprising plate-like, rod-like or linear electrically connected portions in which the electrically connected portion is cut by, for instance, a cutter. In particular, preferably used are pressure-contact type ones which make use of a plate spring or a spiral spring and welded type ones in which a part of a plate spring is connected through welding.

The term "light metal" used herein means elements belonging to Group 1$a$ (except for hydrogen) and Group 2$a$ of Periodic Table, with lithium, sodium and potassium, in particular, lithium being preferred.

The active materials for positive electrodes usable in the present invention may be any materials which allow free absorption and release of a light metal.

Examples of transition metal oxides free of lithium used in the present invention as the positive electrode active materials are $V_2O_5$, $V_6O_{13}$, $MnO_2$, $TiS_2$, $MoS_2$, $MoS_3$, $MoV_2O_8$ and $NbSe_3$. Moreover, examples of preferred lithium-containing transition metal oxides used as the positive electrode active materials are lithium-containing oxides comprising Ti, V, Cr, Mn, Fe, Co, Ni, Cu, Mo and W. These transition metal oxides may be combined with alkali metal other than lithium (elements belonging to Group IA and IIA of Periodic Table) and/or semi-metals such as Al, Ga, In, Ge, Sn, Pb, Sb and Bi and the amount thereof to be mixed with the oxides preferably ranges from 0 to 10 mole %.

Preferred are light metal-containing transition metal oxides and more preferred are those represented by the formula: $Li_xM_yO_z$ (wherein M represents at least one member selected from the group consisting of Ti, V, Cr, Mn, Fe, Co, Ni, W and Mo; x ranges from 0.6 to 2.1; y is 1 or 2; and z ranges from 1.5 to 5) and most preferably $Li_xCoO_2$, $Li_xCo_aNi_{1-a}O_2$, $Li_xMn_2O_4$ and $Li_xCo_bV_{1-b}O_z$ (wherein x ranges from 0.7 to 1.1; a ranges from 0.1 to 0.9; b ranges from 0.9 to 0.98; and z ranges from 2.02 to 2.3).

Preferred lithium-containing transition metal oxides used in the invention as the positive electrode active materials are suitably synthesized by mixing the foregoing ingredients so that the molar ratio: lithium compound/total molar amount of the transition metal compounds (wherein the term ∓transition metal" means at least one member selected from the group consisting of Ti, V, Cr, Mn, Fe, Co, Ni, Mo and W) ranges from 0.3 to 2.2.

Particularly preferred lithium-containing transition metal oxides used in the invention are suitably synthesized by mixing the foregoing ingredients so that the molar ratio: lithium compound/total molar amount of the transition metal compounds (wherein the term "transition metal" means at least one member selected from the group consisting of V, Cr, Mn, Fe, Co and Ni) ranges from 0.3 to 2.2.

Preferred lithium-containing transition metal oxides used in the invention are those represented by the formula: $Li_xMo_z$ (wherein M represents at least one transition metal selected from Co, Mn, Ni, V and Fe, x=0.3~1.2 and z=1.4~3).

Examples of the lithium-containing transition metal oxides more preferably used in the invention as the positive electrode active materials are $Li_x CoO_2$, $Li_xNiO_2$, $Li_x$-

$Co_aNi_{1-a}O_2$, $Li_zCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_z$, $Li_xMn_cFe_{2-c}O_4$, mixture of $Li_xMn_2O_4$ and $MnO_2$, mixture of $Li_{2x}MnO_3$ and $MnO_2$ and mixture of $Li_xMn_2O_4$, $Li_{2x}MnO_3$ and $MnO_2$ (wherein x=0.6~1.2; a=0.1~0.9; b=0.8~0.98; c=1.6~1.96; and z=2.01~5).

Examples of more preferred lithium-containing transition metal oxides used in the invention as the positive electrode active materials are those represented by the following formulas: $Li_xCoO_2$, $Li_xNiO_2Li_xCo_aNi_{1-a}O_2$, $Li_xMn_2O_4$ and $Li_xCo_bV_{1-b}O_z$, (wherein x=0.7~1.1; a=0.1~0.9; b=0.9~0.98; and z=2.01~2.3).

When synthesizing the positive electrode active material used in the present invention, lithium ions are preferably incorporated into a transition metal oxide by reacting metal lithium, a lithium alloy or butyl lithium with the transition metal oxide.

The positive electrode active material can be synthesized by a method comprising mixing a lithium compound with a transition metal oxide and then calcining the mixture or by a solution reaction, with the calcining method being particularly preferred.

The calcining temperature used in the invention may be a temperature at which the mixed compounds used in the invention are partially decomposed or melted and specifically and preferably ranges from 250° to 2000° C., in particular, 350° to 1500° C.

The gas atmosphere used in the invention during the calcining is not restricted to particular ones, but preferred are an air atmosphere or a gas atmosphere having a high oxygen content (for instance, not less than about 30%) for the positive electrode active material and an air atmosphere, a gas atmosphere having a low oxygen content (for instance, not more than about 10%) or an inert gas atmosphere (such as nitrogen gas or argon gas atmosphere) for the negative electrode active material as will be detailed below.

The average particle size of the positive electrode active material used in the invention is not restricted to a particular range, but preferably ranges from 0.1 to 50 μm.

The particle size of the positive electrode active material can be adjusted to a predetermined level through the use of a pulverizer such as a mortar, a ball mill, an oscillating mill, a planetary ball mill, a satellite ball mill or a rotary air jet type jet mill, or through the use of a classifying machine such as a cyclone or a sieve.

In the present invention, the positive electrode active material can be used in combination with a specific carbonate and the current-cutoff effect of the invention can be further improved.

The inventors have investigated carbonates other than lithium carbonate and found out that rubidium can ensure safety during the overcharge at a high charging current even in an amount of not more than 5% by weight and that magnesium, calcium and barium carbonates can ensure safety during the overcharge at a high charging current in an amount of up to about 25% by weight.

The carbonate used in the present invention is preferably sodium carbonate, sodium hydrogen carbonate, potassium carbonate, potassium hydrogen carbonate, rubidium carbonate, rubidium hydrogen carbonate, magnesium carbonate, calcium carbonate and barium carbonate, with sodium carbonate, sodium hydrogen carbonate, potassium carbonate and potassium hydrogen carbonate being more preferred. The amount of the carbonate used in the present invention together with the positive electrode active material is pref-erably not less than 0.1% by weight and not more than 5% by weight, more preferably not less than 0.3% by weight and not more than 4% by weight and most preferably not less than 0.5% by weight and not more than 3% by weight for sodium carbonate, sodium hydrogen carbonate, potassium carbonate, potassium hydrogen carbonate, rubidium carbonate and rubidium hydrogen carbonate, on the basis of the weight of the active material. Moreover, the amount of the carbonate used in the present invention is preferably not less than 0.5% by weight and not more than 25% by weight, more preferably not less than 1.0% by weight and not more than 20% by weight and most preferably not less than 1.5% by weight and not more than 15% by weight for magnesium carbonate, calcium carbonate and barium carbonate, on the basis of the weight of the active material.

The passage "the positive electrode active material is used in combination with sodium and/or potassium and/or rubidium and/or magnesium and/or calcium and/or barium salts of carbonic acid" used herein means that the carbonate is present in the proximity of the positive electrode material when the cell of the present invention is put in use. The carbonate may be incorporated into the positive electrode by adding the carbonate to a slurry for preparing the positive electrode during production of the cell or by adding the carbonate to ingredients other than that for the positive electrode (for instance, the electrolyte) during the production of the cell and then transferring it to the positive electrode through a process such as charging and/or aging, with the method comprising the step of adding, in advance, the carbonate to the slurry for preparing the positive electrode being preferred.

The carbonate used in the present invention can preferably be added to the slurry for positive electrodes by mixing a positive electrode active material, the carbonate and a conductivity-imparting agent, then adding a binder to the resulting mixture and kneading the mixture.

The active materials for negative electrodes usable in the present invention may be any materials which allow free absorption and release of a light metal, are preferably graphite (natural, artificially synthesized and vapor phase-grown graphite), coke (derived from coal or petroleum), calcined products of organic polymers (resins or fibers of polyacrylonitrile, furan resins, cresol resins, phenolic resins), calcined products of mesophase pitch, metal oxides and light metal-containing transition metal oxides and more preferably $GeO$, $GeO_2$, $SnO$, $SnO_2$, $SiSnO_3$, $PbO$, $PbO_2$, $Pb_2O_3$, $Pb_3O_4$, $Sb_2O_3$, $Sb_2O_4$, $Sb_2O_5$, $Bi_2O_3$, $Bi_2O_4$, $Bi_2O_5$, $SnS$, $SnS_2$, $GeS$, $GeS_2$, $InS$, $PbS$, $InO$, $InS$, $ZnO$, $ZnS$, $MgS$, $Li_2SnO_3$, $Li_2GeO_3$, $LiPbO_3$, $Li_3BiO_4$, $Li_3SbO_4$, $Li_2ZnO_2$, $Li_3InO_3$, $Li_2ZnSn_2O_6$, $Li_{0.1}SnO_{2.05}$, $Li_{0.5}SnO_{2.25}$, $Li_4SnO_4$, $Li_6SnO_5$, $Li_{0.1}SnO_{1.05}$, $Li_{0.5}SnO_{1.25}$, $LiSnO_{2.5}$, $Li_8SnO_6$, $Li_2SnO_2$, $Li_8SnO_6$, $Li_2O_2$, $Li_4SnO_4$, $Li_8SnO_5$, non-stoichiometrical compounds of these oxides or compounds represented by the following general formula (1), but the present invention is not restricted to these specific ones:

$$M^1M^2_pM^4_q \qquad \text{General Formula (1)}$$

Wherein $M^1$ and $M^2$ are different from one another and each represents at least one member selected from the group consisting of Si, Ge, Sn, Pb, P, B, Al and As, preferably at least one member selected from the group consisting of Si, Ge, Sn, Pb, P, B and Al and, in particular, at least one member selected from the group consisting of Si, Ge, Pb, P and B; $M^4$ represents at least one member selected from the group consisting of O, S, Se and Te, preferably selected from O and S and in particular O; p=0.001 to 10, preferably 0.01 to 5 and in particular 0.01 to 2; q=1.00 to 50, preferably 1.00 to 26 and in particular 1.02 to 6.

Examples of preferred compounds represented by Formula (1) are $SnSi_{0.01}O_{1.02}$, $SnGe_{0.01}O_{1.02}$, $SnPb_{0.01}O_{1.02}$, $SnSi_{0.01}O_{2.02}$, $SnGe_{0.01}O_{2.02}SnPb_{0.01}O_{2.02}$, $SnSi_{0.05}O_{1.1}$, $SnGe_{0.05}O_{1.1}$, $SnPb_{0.05}O_{1.1}$, $SnSi_{0.05}O_{2.1}$, $SnGe_{0.05}O_{2.1}$, $SnPb_{0.05}O_{2.1}$, $SnSi_{0.1}O_{2.2}$, $SnGe_{0.1}O_{2.2}SnPb_{0.1}O_{2.2}$, $SnSi_{0.1}O_{1.2}$, $SnGe_{0.1}O_{1.2}$, $SnPb_{0.1}O_{1.2}$, $SnSi_{0.2}O_{2.4}$, $SnGe_{0.2}O_{2.4}$, $SnPb_{0.2}O_{2.4}$, $SnSi_{0.2}O_{1.4}$, $SnGe_{0.2}O_{1.4}$, $SnPb_{0.2}O_{1.4}$, $SnSi_{0.3}O_{2.6}$, $SnGe_{0.3}O_{2.6}$, $SnPb_{0.3}O_{2.6}$, $SnSi_{0.3}O_{1.6}$, $SnGe_{0.3}O_{1.6}$, $SnPb_{0.3}O_{1.6}$, $SnSi_{0.1}Ge_{0.1}Pb_{0.1}O_{2.6}$, $SnSi_{0.2}Ge_{0.1}O_{2.6}$, $SnSi_{0.2}Pb_{0.1}O_{2.6}$, $SnGe_{0.2}Si_{0.1}O_{2.6}$, $SnPb_{0.2}Si_{0.1}O_{2.6}$, $SnGe_{0.2}Pb_{0.1}O_{2.6}$, $SnPb_{0.2}Ge_{0.1}O_{2.6}$, $SnSi_{0.7}O_{2.4}$, $SnGe_{0.7}O_{2.4}$, $SnPb_{0.7}O_{2.4}$, $SnSi_{0.8}$, $O_{2.6}$, $SnGe_{0.8}O_{2.6}$, $SnPb_{0.8}O_{2.6}$, $SnSiO_3$, $SnGeO_3$, $SnPbO_3$, $SnSi_{0.9}Ge_{0.1}O_3$, $SnSi_{0.8}Ge_{0.2}O_3$, $SnSi_{0.5}Ge_{0.5}O_3$, $SnSi_{0.9}Pb_{0.1}O_3$, $SnSi_{0.8}Pb_{0.2}O_3$, $SnSi_{0.5}Pb_{0.5}O_3$, $SnGe_{0.9}O_3$, $SnGe_{0.8}Si_{0.2}O_3$, $SnPb_{0.9}Si_{0.1}O_3$, $SnPb_{0.8}Si_{0.2}O_3$, $SnSi_{0.8}Ge_{0.1}Pb_{0.1}O_3$, $SnSi_{1.2}O_{3.4}$, $SnGe_{1.2}O_{3.4}$, $SnPb_{1.2}O_{3.4}$, $SnSi_{1.5}O_4$, $SnGe_{1.5}O_4$, $SnPb_{1.5}O_4$, $SnSi_2O_5$, $SnGe_2O_5$, $SnPb_2O_5$, $SnSi_2O_6$, $SnGe_2O_6$, $SnPb_2O_6$, $SnP_{0.01}O_{1.025}$, $SnB_{0.01}O_{1.015}$, $SnAl_{0.01}O_{1.015}$, $SnP_{0.01}O_{2.025}$, $SnB_{0.01}O_{2.015}$, $SnAl_{0.01}O_{2.015}$, $SnP_{0.05}O_{1.125}$, $SnB_{0.05}O_{1.075}$, $SnP_{0.05}O_{2.125}$, $SnB_{0.05}O_{2.075}$, $SnP_{0.1}O_{1.25}$, $SnB_{0.1}O_{1.15}$, $SnP_{0.2}O_{1.5}$, $SnB_{0.2}O_{1.3}$, $SnP_{0.2}O_{2.5}$, $SnB_{0.2}O_{2.3}$, $SnP_{0.3}O_{1.75}$, $SnB_{0.3}O_{1.45}$, $SnP_{0.7}O_{2.75}$, $SnB_{0.7}O_{2.05}$, $SnP_{0.08}O_3$, $SnB_{0.8}O_{2.2}$, $SnPO_{3.5}$, $SnBO_{2.5}$, $SnSi_{0.25}$, $P_{0.2}B_{0.2}O_3$, $SnSi_{0.5}P_{0.2}B_{0.2}O_3$, $SnSi_{0.9}P_{0.1}O_{2.25}$, $SnSi_{0.8}P_{0.2}O_{3.1}$, $SnSi_{0.6}P_{0.4}O_{2.75}$, $SnSiO_{0.3}P_{0.7}O_{3.35}$, $SnSi_{0.1}P_{0.9}O_{3.45}$, $SnSi_{0.5}P_{0.1}O_{2.25}$, $SnSi_{0.9}Al_{0.1}O_{2.95}$, $SnSi_{0.5}Al_{0.05}O_{2.75}$, $SnSi_{0.5}Al_{0.1}O_{2.15}$, $SnSi_{0.5}Al_{0.5}O_{2.75}$, $SnSi_{0.7}Al_{0.3}O_{2.85}$, $SnSiAl_{0.2}O_{3.3}$, $SnSi_{0.1}Al_{0.1}P_{0.9}O_{3.8}$, $SnSi_{0.3}Al_{0.1}P_{0.7}O_{3.5}$, $SnSi_{0.6}Al_{0.3}P_{0.1}O_{2.9}$, $SnSi_{0.6}Al_{0.2}P_{0.2}O_3$, $SnSi_{0.6}Al_{0.1}P_{0.3}O_{3.1}$, $SnSi_{0.8}Al_{0.1}P_{0.1}O_3$, $SnSi_{0.8}Al_{0.1}P_{0.3}O_{3.5}$, $SnSiAl_{0.1}P_{0.1}O_{3.4}$, $SnSiAl_{0.2}P_{0.2}O_{3.8}$, $SnSiAl_{0.1}P_{0.2}O_{3.65}$, $SnSi_{0.5}Pb_{0.05}O_{2.75}$, $SnSi_{0.5}Pb_{0.1}O_{2.15}$, $SnSi_{0.5}Pb_{0.5}O_{2.75}$, $SnSi_{0.7}Pb_{0.3}O_{2.45}$, $SnSi_{0.9}Pb_{0.1}O_{2.95}$, $SnSiPb_{0.2}O_{3.3}$, $SnSi_{0.1}Ge_{0.1}P_{0.9}O_{3.3}$, $SnSi_{0.3}Ge_{0.1}P_{0.7}O_{3.55}$, $SnSi_{0.6}Ge_{0.3}P_{0.1}O_{3.05}$, $SnSi_{0.6}Ge_{0.2}P_{0.2}O_{3.05}$, $SnSi_{0.6}Ge_{0.1}P_{0.3}O_{3.15}$, $SnSi_{0.8}Ge_{0.1}P_{0.1}O_{3.05}$, $SnSi_{0.6}Ge_{0.1}P_{0.3}O_{3.55}$, $SnSiGe_{0.1}P_{0.1}O_{3.45}$, $SnSiGe_{0.2}P_{0.2}O_{3.9}$, $SnSiGe_{0.1}P_{0.2}O_{3.7}$, $SnSi_{0.1}B_{0.1}P_{0.9}O_{3.6}$, $SnSi_{0.3}B_{0.1}P_{0.7}O_{3.5}$, $SnSi_{0.6}B_{0.3}P_{0.1}O_{2.9}$, $SnSi_{0.6}B_{0.2}P_{0.2}O_3$, $SnSi_{0.6}B_{0.1}P_{0.3}O_{3.1}$, $SnSi_{0.8}B_{0.1}P_{0.1}O_3$, $SnSi_{0.8}B_{0.1}P_{0.2}O_{3.5}$, $SnSiB_{0.1}P_{0.1}O_{3.4}$, $SnSiB_{0.2}P_{0.2}O_{3.8}$, $SnSiB_{0.1}P_{0.2}O_{3.65}$, $SnSi_{0.1}Pb_{0.9}P_{0.9}O_{3.6}$, $SnSi_{0.3}Pb_{0.1}P_{0.7}O_{3.5}$, $SnSi_{0.6}Pb_{0.3}P_{0.1}O_{2.9}$, $SnSi_{0.6}Pb_{0.2}P_{0.2}O_3$, $SnSi_{0.6}Pb_{0.1}P_{0.3}O_{3.1}$, $SnSi_{0.8}Pb_{0.1}P_{0.1}O_3$, $SnSi_{0.8}Pb_{0.1}P_{0.3}O_{3.5}$, $SnSiPb_{0.1}P_{0.1}O_{3.4}$, $SnSiPb_{0.2}P_{0.2}O_{3.8}$, $SnSiPb_{0.2}P_{0.2}O_{3.65}$, $SnSi_{0.8}Ge_{0.1}Al_{0.1}O_{2.95}$, $SnSi_{0.8}Ge_{0.1}B_{0.1}O_{2.95}$ and $SnSi_{0.8}Ge_{0.1}Sb_{0.1}O_{2.95}$, but the present invention is not restricted to these specific compounds.

Examples of more preferred negative electrode active materials used in the invention are $SnO$, $SnO_2$, $GeO$, $GeO_2$, $SnS$, $Li_2SnO_3$, $SiSnO_3$, $SiGeO_3$, $SiPbO_3$, $SnSi_{0.9}Ge_{0.1}O_3$, $SnSi_{0.8}Ge_{0.2}O_3$, $SnSi_{0.5}Ge_{0.5}O_3$, $SnSi_{0.9}Pb_{0.1}O_3$, $SnSi_{0.8}Pb_{0.2}O_3$, $SnSi_{0.5}Pb_{0.5}O_3$, $SnGe_{0.9}Si_{0.1}O_3$, $SnGe_{0.8}Si_{0.2}O_3$, $SnPb_{0.9}Si_{0.1}O_3$, $SnPb_{0.8}Si_{0.2}O_3$, $SnSi_{0.8}Pb_{0.1}Ge_{0.1}O_3$, $SnSi_{0.8}P_{0.2}O_{3.1}$, $SnSi_{0.8}P_{0.2}Al_{0.2}O_{3.4}$, $SnSi_{0.6}P_{0.4}O_{3.2}$, $SnSi_{0.6}P_{0.4}Al_{0.2}O_{3.5}$, $SnSi_{0.8}P_{0.4}Sb_{0.1}O_{3.25}$, $SnSi_{0.6}P_{0.2}Ge_{0.1}Al_{0.1}O_{3.05}$, $SnP_2O_7$, $SnP_2Al_{0.2}O_{7.3}$ and $SnSi_{0.2}P_{0.8}Al_{0.2}O_{3.7}$.

The negative electrode active material used in the invention may comprise various kinds of compounds. Examples of such compounds include transition metals (such as Sc, Ti, V, Cr, Mn, Fe, Co, Ni, Cu, Zn, Y, Zr, Nb, Mo, Tc, Ru, Rh, Pd, Ag, Cd, lanthanoid elements, Hf, Ta, W, Re, Os, Ir, Pt, Au and Hg) and elements belonging to Group IIa (such as Be, Mg, Ca, Sr and Ba), Group IIIb (such as B, Al, Ga, In and Ti), Group Vb (such as N, P, As, Sb and Bi), Group VIb (such as S, Se, Te and Po) and/or Group VIIb (such as F, Cl, Br and I) of Periodic Table. Moreover, the active material may likewise include dopants of various compounds capable of increasing the electron conductivity thereof (such as compounds of Sb, In and Nb). The amount of these compounds to be added preferably ranges from 0 to 20 mole %.

The negative electrode active material can be prepared by, in case of $SnO_2$, mixing an aqueous solution of an Sn compound such as stannic chloride, stannic bromide, stannic sulfate or stannic nitrate with an aqueous solution of an alkali hydroxide such as lithium hydroxide, sodium hydroxide, potassium hydroxide, calcium hydroxide, magnesium hydroxide or ammonium hydroxide to thus precipitate stannic hydroxide, then washing the precipitates and separating them. After roughly drying the stannic hydroxide, it is calcined at a temperature ranging from 250° to 2000° C. in the air, a gas having a high oxygen content or a gas having a low oxygen content. Alternatively, the precipitated stannic hydroxide per se may be calcined and then washed. Moreover, in case of SnO, the active material can likewise be produced by mixing an aqueous solution of stannous chloride, stannous bromide, stannous sulfate or stannous nitrate with an aqueous solution of an alkali hydroxide such as lithium hydroxide, sodium hydroxide, potassium hydroxide, calcium hydroxide, magnesium hydroxide or ammonium hydroxide, followed by boiling the resulting mixture. Alternatively, it can be prepared by calcining stannous oxalate at a temperature ranging from 250° to 1000° C. in a gas atmosphere having a low oxygen content.

The compound oxides represented by the general formula (1) may be synthesized by either a calcination method or a solution method. The calcination method will be detailed below by way of example. An $M^1$ compound and an $M^2$ compound ($M^1$ and $M^2$ differ from one another and each represents at least one member selected from the group consisting of Si, Ge, Sn, Pb, P, B, Al and As) are mixed together and then calcined.

Examples of Sn compounds include SnO, $SnO_2$, $Sn_2O_3$, $Sn_3O_4$, $Sn_7O_{13} \cdot H_2O$, $Sn_8O_{15}$, stannous hydroxide, stannic oxyhydroxide, stannic acid, stannous oxalate, stannous phosphate, orthostannic acid, metastannic acid, parastannic acid, stannic fluoride, stannous chloride, stannic chloride, stannous bromide, stannic bromide, stannous iodide and stannic iodide.

Examples of Si compounds include $SiO_2$, SiO, halogenated organosilicon compounds such as silicon tetrachloride, silicon tetrabromide, trichloromethylsilane, dimethyldichlorosilane and trimethylchlorosilane, organosilicon compounds such as tetramethylsilane and tetraethylsilane, alkoxysilane compounds such as tetramethoxysilane and tetraethoxysilane, and hydrosilane compounds such as trichlorohydrosilane.

Examples of Ge compounds are $GeO_2$, GeO, germanium tetrachloride, germanium tetrabromide, and alkoxygermanium compounds such as germanium tetramethoxide, germanium tetraethoxide.

Examples of Pb compounds are $PbO_2$, PbO, $Pb_2O_3$, $Pb_3O_4$, $PbCl_2$, lead chlorate, lead perchlorate, lead nitrate, lead carbonate, lead acetate, lead tetraacetate and lead tartrate.

As conditions for the calcination, the rate of heating is preferably not less than 4° C./min and not more than 2000° C./min, more preferably not less than 10° C./min and not more than 2000° C./min. The calcination temperature is preferably not less than 250° C. and not more than 1500° C., more preferably not less than 350° C. and not more than 1500° C. The calcination time is preferably not less than 0.01 hour and not more than 100 hours, more preferably not less than 0.5 hour and not more than 70 hours. The rate of cooling is preferably not less than 2° C./min and not more than 107° C./min, more preferably not less than 6° C./min. and not more than 107° C./min.

The cooling may be carried out in a calcination furnace or by withdrawing from the calcination furnace and then introducing into, for instance, water. Moreover, it is also possible to use very rapid cooling methods such as gun method, Hanner-Anvil method, slap method as disclosed in Ceramics Processing, 1987, p. 217, Gihodo Publishing Company, gas atomizing method, plasma spray method, centrifugal rapid cooling method, melt drag method. The cooling may likewise be performed using a single roller method and a double roller method as disclosed in New Glass Handbook, 1991, p. 172 (Maruzen Publishing Company). If the materials are melted during calcination, the melt is preferably stirred.

The gas atmosphere for the calcination is not restricted to specific ones and may be an oxidizing atmosphere and a reducing atmosphere. For instance, the negative electrode active material is synthesized in the air or in a gas atmosphere having an arbitrary oxygen concentration or an inert gas atmosphere. The gas atmosphere for the calcination is preferably those having an oxygen content of not more than 5% by volume and more preferably an inert gas atmosphere. Examples of such inert gases are nitrogen, argon, helium, krypton and xenon.

The negative electrode active material used in the invention may be a crystalline or amorphous material or may be a mixture thereof, with amorphous compounds being preferred from the viewpoint of ability of improving the cycle life of the resulting cell.

The negative electrode active material used in the invention has an average particle size (D) ranging from 0.7 to 25 μm and not less than 60% by volume thereof preferably has a particle size ranging from 0.5 to 30 μm. More preferably, the average particle size (D) ranges from 0.8 to 20 μm and not less than 75% by volume thereof has a particle size ranging from 0.5 to 30 μm. In particular, the average particle size (D) ranges from 1.0 to 16 μm and not less than 90% by volume thereof has a particle size ranging from 0.5 to 30 μm.

The term "average particle size" herein used means the median diameter of primary particles and determined by a laser diffraction type size distribution-determining device.

In the negative electrode active material used in the invention, the rate of particles having a particle size of not more than 1 μm is preferably not more than 30% based on the total volume of the material and that of particles having a particle size of not less than 20 μm is preferably not more than 25% based on the total volume of the material. More preferably, the rate of particles having a particle size of not more than 1 μm is not more than 20% and that of particles having a particle size of not less than 20 μm is not more than 14%, based on the total volume of the material. In particular, the rate of particles having a particle size of not more than 1 μm is not more than 10% and that of particles having a particle size of not less than 20 μm is not more than 10%, based on the total volume of the material.

The specific surface area of the negative electrode active material used in the invention preferably ranges from 0.1 to 10 $m^2/g$, more preferably 0.1 to 8 $m^2/g$ and, in particular, 0.2 to 7 $m^2/g$. The specific surface area can be determined by the usual BET method.

The calcined product or that roughly ground is preferably pulverized and/or subjected to classification to obtain the active material having a desired particle size. The pulverization may be performed by dry pulverization methods or wet pulverization methods which make use of a solvent as the medium. Preferably, the solvents used in the wet pulverization methods are, for instance, water, toluene, xylene, methanol, ethanol, n-propanol, isopropyl alcohol, isobutyl alcohol, acetone, methyl ethyl ketone, butyl acetate and N,N-dimethylformamide from the viewpoint of easy handling and high safety. The amount of the solvent is 1/10 to 20 times, preferably 1/5 to 10 times the amount of a powdery material to be pulverized. The pulverization method is preferably a dry pulverization method and/or a wet pulverization method which makes use of water as the pulverization medium. Examples of pulverizers usable herein are mortar, ball mill, circularly oscillating ball mill, rotationally oscillating ball mill, planetary ball mill, satellite ball mill, rotary air jet type jet mill, pot mill, centrifugal mill, tower mill, sand mill, attritor, centrimill, dynomill, roller mill, pin mill, tube mill, rod mill and jaw crusher, with rotary air jet type jet mill, ball mill and oscillation ball mill being preferred pulverization methods. Moreover, the powdery material is preferably classified to obtain a powdery product having a desired particle size and wind-power classifying devices (such as cyclone) and sieves are preferably used for this purpose. When classifying the material by passing through a sieve, preferred are dry classification methods or wet classification methods which make use of a solvent such as water. In addition, the temperature for the pulverization and classification varies depending on the kinds of materials to be treated and solvents used, but preferably ranges from 5° to 150° C. and more preferably 10° to 90° C.

Prior to forming the negative electrode active material used in the invention into a depolarizing mix for electrodes, the active material is preferably subjected to a heat-treatment at a temperature ranging from 100° to 400° C. in order to improve the cell capacity. The heat-treatment may be carried out in an atmosphere such as air, an inert gas atmosphere (such as argon gas, nitrogen gas or helium gas atmosphere), in an active gas atmosphere such as oxygen gas or hydrogen gas atmosphere, or a pressed atmosphere or a reduced-pressure atmosphere, with air, inert gas atmosphere and reduced-pressure atmosphere being preferred. The term "prior to forming into a depolarizing mix" herein used means "before mixing the active material with, for instance, a binder and/or a conductivity-imparting agent", i.e., the heat-treatment of the active material alone. Moreover, the negative electrode active material is preferably heat-treated not more than 90 days or immediately before forming it into a depolarizing mix, more preferably not more than 30 days or immediately before forming it into a depolarizing mix. The temperature for the heat-treatment more preferably ranges from 120° to 350° C. and in particular 150° to 300° C. The heat-treatment time preferably ranges from 0.5 to 120 hours, more preferably 1 to 80 hours and most preferably 1 to 48 hours.

In the present invention, lithium may be, in advance, added to the negative electrode active material prior to accommodation of the material into a cell container and the addition of lithium may be carried out by a chemical or electrochemical method. The method for chemically adding lithium to the active material comprises directly reacting the active material with elemental lithium, a lithium alloy (such as a lithium-aluminum alloy) or a lithium compound (such as n-butyl lithium, lithium hydride or lithium aluminum hydride). In this case, the active material may directly be reacted with a lithium-adding agent or they are reacted in the presence of an anhydrous solvent (such as dimethoxyethane, tetrahydrofuran, ethylene carbonate or diethyl carbonate) or an electrolyte (for instance, those obtained by dissolving supporting salts such as $LiPF_6$ in the foregoing anhydrous solvents). In this case, a preferred embodiment comprises, for instance, mixing the powdery negative electrode active material with powdery lithium metal directly or in the presence of an electrolyte to thus add lithium to the active material, or forming the active material into a sheet-like product and then attaching the sheet to lithium metal under pressure in the presence of an electrolyte. In addition, it is also preferred to add lithium to the active material by immersing the powdery active material or a sheet thereof in an n-butyl lithium solution. More effective addition of lithium to the active material can be ensured if the lithium-addition reaction in the chemical method is carried out at a temperature preferably on the order of 25° to 80° C., more preferably 30° to 75° C. and most preferably 30° to 70° C.

Most preferred method for electrochemically adding lithium ions to the negative electrode active material comprises discharging, in an open system, a redox system which comprises an intended oxide as a positive electrode active material (i.e., a material herein referred to as the negative electrode active material), lithium metal or a lithium alloy (such as a lithium-aluminum alloy) as a negative electrode active material and a lithium salt-containing non-aqueous electrolyte. In this case, it is preferred to pass, through the reaction system, a current ranging from 0.02 to 0.2 A, more preferably 0.03 to 0.15 A and most preferably 0.04 to 0.12 A per 1 g of the oxide as a precursor. According to another embodiment, the method for electrochemically adding lithium ions to the negative electrode active material may comprise charging a redox system comprising a lithium-containing transition metal oxide as a positive electrode active material, a negative electrode active material and a lithium salt-containing non-aqueous electrolyte.

The amount of lithium to be added varies depending on the kinds of the negative electrode active materials used, but preferably 0.5 to 4.5 equivalent, more preferably 1 to 4 equivalent and most preferably 1.5 to 3.5 equivalent on the basis of the amount of the active material. In this respect, the term "prior to accommodation into a cell container" means "the period extending from about 30 days before the accommodation to an instance immediately before the accommodation, preferably 10 days before the accommodation to an instance immediately before the accommodation and most preferably 5 days before the accommodation to an instance immediately before the accommodation". In this case, the term "accommodation" means that the cell-constituting elements are accommodated in a cell container followed by calking to complete the cell.

The negative electrode active material usable in the invention may likewise be calcined carbonaceous compounds capable of absorbing and releasing lithium ions.

The depolarizing mix for positive and negative electrodes may comprise a conductivity-imparting agent, a binder and/or a filler.

The conductivity-imparting agent may be any electron-conductive material which does not undergo any chemical change within the assembled cell and may usually be at least one conductive material selected from the group consisting of natural graphite (such as scaly graphite, flaky graphite and soil-like graphite), artificial graphite, carbon black, acetylene black, ketchen black, carbon fibers, metal (such as copper, nickel, aluminum and silver) powder, metal fiber and polyphenylene derivatives, with the simultaneous use of graphite and acetylene black being particularly preferred.

The amount thereof to be added is not restricted to a specific range, but preferably ranges from 1 to 50% by weight, in particular 2 to 30% by weight. If carbon and graphite are used, the amount thereof particularly preferably ranges from 2 to 15% by weight.

The binder for positive and negative electrodes used herein is usually at least one member selected from the group consisting of polysaccharides, thermoplastic resins and polymers having rubber elasticity such as starch, polyacrylic acid, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene-diene terpolymer (EPDM), sulfonated EPDM, styrene-butadiene rubber, polybutadiene, fluororubber and polyethylene oxide with polyacrylic acid, carboxymethyl cellulose, polytetrafluoroethylene and polyvinylidene fluoride being particularly preferred. In this respect, if a compound having functional groups reactive with lithium such as polysaccharides is used, it is preferred to deactivate the functional groups through addition of a compound carrying, for instance, an isocyanate group. The amount of the binder to be added is not particularly restricted, but preferably ranges from 1 to 50% by weight and in particular 2 to 30% by weight.

The filler may be any fibrous material which does not undergo any chemical change within the assembled cell. Examples thereof usually used are olefinic polymers such as polypropylene and polyethylene, and fibers such as glass and carbon fibers. The amount of the filler to be added is not restricted to a particular range, but preferably ranges from 0 to 30% by weight.

Materials for supports of the positive and negative electrodes usable in the present invention may be any electron-conductive material which does not undergo any chemical change within the assembled cell. Examples of materials for the supports are aluminum, stainless steel, nickel, titanium or alloys thereof, calcined carbon, and aluminum and stainless steel whose surface is treated with carbon, nickel, titanium or silver for the positive electrode and copper, stainless steel, nickel, titanium or alloys thereof, calcined carbon, copper and stainless steel whose surface is treated with carbon, nickel, titanium or silver, and Al-Cd alloys for the negative electrode. The surface of these materials may be oxidized. The support may have a shape such as a foil, film, sheet, net, expanded metal, punching metal, lath body, porous body, foamed body, molded products of fibers or wire mesh. In particular, preferred are an aluminum foil for the positive electrode and a copper foil for the negative electrode. The thickness of the support is not restricted to a particular range, but in general ranges from 1 to 500 µm.

The separator usable in the present invention may be any insulating thin film having a high ion-permeability and desired mechanical strength and examples of materials for the separator include olefinic polymers, fluoropolymers, cellulosic polymers, polyimides, polyamides, glass fibers and alumina fibers, which may be used in the form of sheets, nonwoven fabrics, woven fabrics and microporous films. In particular, preferred materials are polypropylene, polyethylene, mixture of polypropylene and Teflon (registered trademark) and mixture of polyethylene and Teflon and preferred shape of the separator include microporous films. Particularly preferred are microporous films each having a pore size ranging from 0.01 to 10 µm and a thickness ranging from 5 to 300 µm.

The electrolytes usable herein are those obtained by dissolving at least one electrolyte selected from the group consisting of $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, chloroborane lithium salt and lithium tetraphenylborate in an organic solvent comprising at least one member selected from the group consisting of propylene carbonate, ethylene carbonate, butylene carbonate, dimethyl carbonate, diethyl carbonate, methyl ethyl carbonate, 1,2-dimethoxyethane, 7-butyrolactone, tetrahydrofuran, 2-methyl tetrahydrofuran, dimethylsulfoxide, dioxolan, 1,3-dioxolan, formamide, dimethylformamide, nitromethane, acetonitrile, methyl formate, methyl acetate, methyl propionate, ethyl propionate, phosphoric acid triesters, trimethoxymethane, dioxolan derivatives, sulfolane, 3-methyl-2-oxazolidinone, propylene carbonate derivatives, tetrahydrofuran derivatives, diethyl ether and 1,3-propanesultone. Preferred are those obtained by dissolving $LiCF_3SO_3$, $LiClO_4$, $LiBF_4$ and/or $LiPF_6$ in a mrxed solvent comprising propylene carbonate or ethylene carbonate and 1,2-dimethoxyethane and/or diethyl carbonate and, in particular, the electrolyte is preferably comprises at least ethylene carbonate and $LiPF_6$.

The amount of these electrolytes to be added to the cell is not restricted to a particular range and varies depending on the amounts of positive and negative electrode active materials and the size of the cell to be assembled.

The volume ratio of the solvents used in the mixed solvent is not also restricted to a specific range, but preferably ranges from 0.4/0.6 to 0.6/0.4 for propylene carbonate or ethylene carbonate or butylene carbonate/1,2-dimethoxyethane and/or diethyl carbonate mixed solvents (preferably 0.4/0.6 to 0.6/0.4 when ethylene carbonate and butylene carbonate are simultaneously used and 0.4/0.6 to 0.6/0.4 when 1,2-dimethoxyethane and diethyl carbonate are simultaneously used).

The concentration of a supporting electrolyte is not particularly restricted, but preferably ranges from 0.2 to 3 moles per liter of the electrolyte solution.

The following solid electrolytes may likewise be used in addition to the foregoing electrolyte solutions.

The solid electrolytes are divided into inorganic and organic solid electrolytes.

Well-known inorganic solid electrolytes are, for instance, nitride, halides and oxyacid salts of lithium, Among these, effectively used are $Li_3N$, LiI, $Li_5NI_2$, $Li_3N$-LiI-LiOH, $LiSiO_4$, $LiSiO_4$-LiI-LiOH, $xLi_3PO_4$-$(1-x)Li_4SiO_4$, $Li_2SiS_3$ and phosphorus sulfide compounds.

Examples of organic solid electrolytes effectively used are polyethylene oxide derivatives or polymers containing the derivatives; polypropylene oxide derivatives or polymers containing the derivatives; polymers carrying ionically dissociable groups; mixture of the polymers carrying ionically dissociable groups with the foregoing aprotic electrolyte solutions; and phosphoric acid ester polymers.

Moreover, it has been known that polyacrylonitrile is added to the electrolyte solution. In addition, a method which makes use of a combination of inorganic and organic solid electrolytes has also been known.

It has been known to add the following compounds to the electrolyte for improving the discharge and charge-discharge properties of the resulting cell and examples of such compounds are pyridine, triethyl phosphite, triethanolamine, cyclic ethers, ethylenediamine, n-glyme, hexaphosphoric acid triamide, nitrobenzene derivatives, sulfur, quinoneimine dyes, N-substituted oxazolidinone and N,N'-substituted imidazolidinone, ethylene glycol dialkyl ethers, quaternary ammonium salts, polyethylene glycol, pyrrole, 2-methoxyethanol, $AlCl_3$, monomers for conductive polymer electrode active materials, triethylene phosphoramide, trialkyl phosphines, morpholine, aryl compounds carrying carbonyl groups, hexamethylphosphoric triamide and 4-alkylmorpholines, bicyclic tertiary amines, oils, quaternary phosphonium salts and tertiary sulfonium salts.

The electrolyte may comprise a halogen atom-containing solvent such as carbon tetrachloride and/or trifluorochloroethylene to make the electrolyte non-combustible. Moreover, carbon dioxide gas may be added to the electrolyte to impart high-temperature storability to the resulting cell.

Further the depolarizing mixes for positive and negative electrodes may comprise an electrolyte solution or an electrolyte. For instance, there have been known a method in which the foregoing ion-conductive polymer, nitromethane and/or an electrolyte solution are incorporated into the depolarizing mixes.

In addition, the surface of the positive electrode active material can be modified by, for instance, treating the surface of a metal oxide with an esterifying agent, a chelating agent, a conductive polymer and/or polyethylene oxide.

The surface of the negative electrode active material can likewise be modified by, for instance, applying a layer of an ion-conductive polymer or polyacetylene thereto or treating the surface with, for instance, LiCl.

Materials for the closed-end armoring can usable in the present invention may be, for instance, nickel-plated steel plates, stainless steel plates (such as SUS 304, SUS 304L, SUS 304N, SUS 316, SUS 316L, SUS 430 and SUS 444), nickel-plated stainless steel plates (such as those listed above), aluminum or alloys thereof, nickel, titanium and copper, which may be in the form of cylinders having a circular-section, elliptic-section, square-section and rectangular-section. In particular, if the armoring can simultaneously serves as a negative terminal, stainless steel plates and nickel-plated steel plates are preferred, while if the armoring can simultaneously serves as a positive terminal, stainless steel plates, aluminum or alloys thereof are preferred.

The gaskets usable in the present invention may be those prepared from olefinic polymers, fluoropolymers, cellulosic polymers, polyimides and polyamides, with olefinic polymers being preferred because of high resistance to organic solvents and low water-permeability, and block copolymers of propylene and ethylene being more preferred.

The cell of the present invention is, if necessary, covered with an armoring material. Examples of such armoring materials are heat-shrinkable tubings, adhesive tapes, metal films, paper, cloths, paint and varnish and plastic cases. The armor may partially be composed of a portion which undergoes color change upon heating so that the heat history of the cell during use can be monitored.

A plurality of the cells of the present invention are optionally combined in series or parallel and accommodated in a cell-package. The cell package may be provided with a resistor having a positive temperature coefficient, a temperature fuse and safety elements such as a fuse and/or a current cutoff element as well as a safety circuit (i.e., a circuit having functions for monitoring, for instance, the voltage, temperature and current of each cell and/or a cell assembly and, if necessary, a circuit for cutting off the current). In addition, the cell package may comprises, in addition to positive and negative terminals for the entire cell assembly, external terminals such as positive and negative terminals for each cell, temperature-detecting terminals for the cell assembly and/or each cell and a current-detecting terminal for the cell assembly. Moreover, the cell package may comprise built-in voltage-conversion circuit (such as DC-DC converter). Further the connection of each cell may be performed by fixing the cell through welding the lead plate thereof or by fixing it through the use of, for instance, a socket so that it is easily removable. Moreover, the cell package may have a function for displaying the remaining capacity thereof, necessity of charging, number of use or the like.

The cell may have any shape such as a coin, button, sheet, cylinder or square.

If the cell is in a coin or button-like shape, the depolarizing mixes of positive and negative electrode active materials are principally used after compressing them into pellets. The thickness and diameter of the pellet are determined depending on the size of the cell. On the other hand, if the cell is in a sheet, cylinder or square shape, the depolarizing mixes of positive and negative electrode active materials are principally used by coating them on a current collector, drying and then compressing. The thickness, length and width of the coated layer are determined depending on the size of the cell, but the thickness thereof particularly preferably ranges from 1 to 2000 μm.

The drying and dehydration of the pellets and sheets may be carried out through the use of methods currently adopted. In particular, it is preferred to use hot air, vacuum, infrared rays, far infrared rays, electron beam and low humidity air drying techniques which may be used alone or in any combination. The temperature for the drying and dehydration preferably ranges from 80° to 350° C. and in particular 100° to 250° C. The total water content of the cell is preferably not more than 2000 ppm and the water contents of the depolarizing mixes for positive and negative electrodes and the electrolyte each is preferably not more than 500 ppm from the viewpoint of the cycle life of the resulting cell.

The pellets and sheets may be pressed by any currently used method, but the speed of pressing in the mold press and calender press methods preferably ranges from 0.1 to 50 m/min. The temperature for the pressing step preferably ranges from room temperature to 200° C.

The sheet of the depolarizing mix is wound or folded, then inserted into a can, followed by electrical connection of the can to the sheet, injection of an electrolyte and seal of the can for the cell with a closing lid. In this respect, a safety valve may be used as the closing lid. In addition to the safety valve, the cell may be provided with various safety elements conventionally known. For instance, fuses, bimetals and PTC elements are used as the overcurrent-inhibitory element. Moreover, the cell may be provided with a circuit combined with a method for making cuts on the cell-can, a gasket or the closing lid as a measure for preventing an increase in the internal pressure of the cell-can.

The electrolyte may be injected at a time, but preferably it is stepwise injected in at least two portions. If the electrolyte is stepwise injected in at least two portions, the portions may have the same composition or different compositions (for instance, first a non-aqueous solvent or a solution of a lithium salt in a non-aqueous solvent is injected and then a non-aqueous solvent having a viscosity higher than that of the foregoing solvent or a solution of a lithium salt in the non-aqueous solvent is injected). In addition, a reduced pressure (preferably ranging from 500 to 1 torr and more preferably 400 to 10 torr) may be applied to the cell-can or a centrifugal force or ultrasonics may be applied to the cell-can, for the reduction of the time required for the injection of the electrolyte.

The can and lead plate may be produced from electrically conductive metals or alloys, for instance, metals such as iron, nickel, titanium, chromium, molybdenum, copper and aluminum or alloys thereof. The cap, can, sheet, lead plate may be welded by any known method (such as direct or alternating current electric welding, laser welding and ultrasonic welding).

The cutoff voltage for the charge-discharge cycle is not unconditionally determined since it varies depending on the kinds and combinations of the positive and negative electrode active materials used, but is preferably a voltage which can ensure a high discharge voltage and can substantially maintain a long cycle life.

The cell of the present invention can be used in various apparatuses. In particular, the cell of the invention is preferably used in video movies, portable video decks provided with built-in monitors, movie cameras provided with built-in monitors, compact cameras, single-lens reflex cameras, disposable cameras, films provided with lenses, notebook-type personal computers, notebook-type word processors, electronic notebooks, portable telephones, cordless telephones, shavers, motor-driven tools, motor-driven mixers and motorcars.

The non-aqueous secondary cell of the present invention are not limited to specific applications, but may be used in, for instance, electronic apparatuses such as color notebook type personal computers, monochromatic notebook type personal computers, pencil-input type personal computers, pocket (palm-top) type personal computers, notebook type word processors, pocket type word processors, electronic book type players, portable telephones, secondary telephones for cordless telephones, pagers, handy terminals, portable facsimiles, portable copiers, portable printers, headphone stereos, video movies, liquid crystal televisions, handy cleaners, portable CD's, minidiscs, electric shavers, electronic translators, telephones for motorcars, transceivers, motor-driven tools, electronic memorandom books, electronic calculators, memory cards, tape recorders, radios, back-up electric power sources and memory cards. The secondary cell may likewise be used in apparatuses and tools for daily life such as motorcars, electric motored vehicles, motors, lighting equipments, toys, machinery and tools for games, road conditioners, electric irons, watches, stroboscopes, cameras, medical machinery and tools (such as pacemakers, hearing aids and massagers). The cell may be used for various kinds of war supplies and for space development. In addition, the cell may be combined with solar cells.

In case of non-aqueous secondary cells, the cell temperature increases when abnormality such as overcharge or short occurs, as has been described above. Therefore, if the cell is an enclosed type one, the electrolyte begins to vaporize when the cell is successively maintained at a condition of overcharge or short and thus the internal pressure of the cell increases. In particular, the cell voltage is high when it is in an overcharge condition, the electrolyte or active materials abruptly cause, for instance, decomposition at a certain instance and the cell is often exploded. The enclosed type non-aqueous secondary cell of the present invention has a structure capable of completely and precisely cutting off the current path at the initial stage of an increase in the cell temperature or the internal pressure thereof in order to prevent, in advance, the worst case, i.e., explosion of the cell even under overcharge conditions. More specifically, a switch for current-cutoff is arranged on an explosion-proof valve at the side opposite to an electrode group and this accordingly permits the prevention of any deterioration of the precision in the current-cutoff at the switching portion due to, for instance, corrosion of the welded or contact part by the action of the electrolyte. Moreover, the switch for current-cutoff is a non-reverse type one and thus any intermittent increase in the cell voltage is not caused, at all, during overcharge. In addition, the lead plate extended from the positive or negative electrode of the electrode group is not broken or peeled off during current-cutoff and therefore, the lead plate is not in any suspended state and does not come in contact with the inner wall of the cell armoring can to thus cause internal short. Moreover, the valve per se which undergoes deformation when the internal pressure within the cell increases is not joined through welding and accordingly, the valve does not have any defects such as pinholes. Thus, the enclosed type non-aqueous secondary cell of the present invention is quite safe even when abnormality such as overcharge or short occurs.

The present invention will hereunder be described in more detail with reference to the following Examples, but the present invention is not restricted to these specific Examples and should include various variations and modifications so far as they are not beyond the scope of the present invention.

EXAMPLE 1

An enclosed type non-aqueous secondary cell was assembled, as shown in FIG. 1, by winding, through separators, positive electrodes produced by applying a positive electrode active material-containing depolarizing mix to current collectors and negative electrodes produced by applying a negative electrode active material-containing depolarizing mix to current collectors to give an electrode group 2; sandwiching the electrode group 2 between insulating materials; then accommodating the sandwiched electrode group 2 in an armoring can 1 for cell; arranging a closing lid on the opening of the armoring can 1 through an insulating gasket 5 to thus airtightly sealing the can 1. In this respect, the closing lid was electrically connected to a lead plate 4 extended from the positive electrode and a lead plate (not shown) extended from the negative electrode was electrically connected to the cell-armoring can 1 so that the closing lid and the cell-armoring can 1 served as positive and negative terminals respectively.

The positive electrode was prepared by mixing $LiCoO_2$ (87 parts by weight) as active material, graphite (9 parts by weight) as a conductivity-imparting agent and sodium polyacrylate (one part by weight) and polytetrafluoroethylene (3 parts by weight) as binders, kneading the mixture together with water as a medium to give a slurry, then applying the slurry onto both sides of an aluminum foil (current collector; thickness: 20 μm), drying the coated slurry and compression-molding the current collector using a calender press to give a band-like positive electrode (thickness: 250 μm).

The negative electrode was prepared by mixing $SiSnO_3$ (86 parts by weight) as active material, acetylene black (3 parts by weight) and graphite (6 parts by weight) as conductivity-imparting agents and polyvinylidene fluoride (4 parts by weight) and carboxymethyl cellulose (one part by weight) as binders, kneading the mixture together with water as a medium to give a slurry, then applying the slurry onto both sides of a copper foil (current collector; thickness: 18 μm), drying the coated slurry and compression-molding the current collector using a calender press to give a band-like negative electrode (thickness: 80 μm).

Each of the positive and negative electrodes thus prepared was cut into pieces having a predetermined size after dehydrating and drying the electrodes in a low humidity atmosphere (dew point: −50° C.), lead plates 4 of aluminum and nickel were secured to the ends of the positive and negative electrodes respectively and these positive and negative electrodes were wound through microporous film separators of polypropylene (Cell Guard: #2400) to give an electrode assembly. Then the electrode group 2 was accommodated in a cylindrical closed-end cell-armoring can 1 having a circular section (produced from a nickel-plated steel plate) together with an electrolyte which was a 1 mol/l solution of $LiPF_6$ in a 2:8 (volume ratio) mixed solvent of ethylene carbonate and diethyl carbonate, followed by sealing the armoring can 1 with a closing lid, as will be detailed below, and a gasket 5 of propylene/ethylene copolymer to give a cylindrical cell having a diameter of 18 mm and a height of 65 mm.

(Cell 1)

As shown in FIG. 1, a thin film-like explosion-proof valve 6 was produced by fusing, with heating, a valve body which was prepared by applying a heat-fusible resin onto one side of an aluminum thin film and then drying the coated resin layer to a flat portion near the periphery of a dish-like lid body 6a of SUS 316L having a vent hole 6b at the center and a rising portion 6c at the outer periphery and then holding and supporting the fused portion by inwardly bending the rising portion 6c of the dish-like lid body 6a through a ring-like plate. A switch for current-cutoff was provided by arranging and laminating a conductive body 7, an insulating plate 11 and a resistor 8 having a positive temperature coefficient (hereunder referred to as "PTC element") in this order from the side of the explosion-proof valve. In this respect, the conductive body 7 consists of a shape memory alloy and has a rising portion 13 protruded towards the PTC element 8 at the center thereof. The conductive body 7 comes in contact with the PTC element 8 to ensure electrical connection therebetween and simultaneously, at the outer periphery thereof, comes in contact with the outer periphery of the explosion-proof valve to thus ensure electrical connection therebetween. The insulating material 11 has a ring-like shape and insulates the conductive body 7 from the PTC element 8 at the outer periphery. The terminal cap 9 provided with vent holes 9a has a projected portion at the center thereof and comes in contact with the PTC element 8 at the outer periphery to ensure electrical connection. In this Example, the foregoing ring-like plate and the terminal cap 9 used were those produced from a nickel-plated steel plate. The cell provided with the closing lid thus produced is referred to as Cell 1.

(Cell 2)

Figure 3:
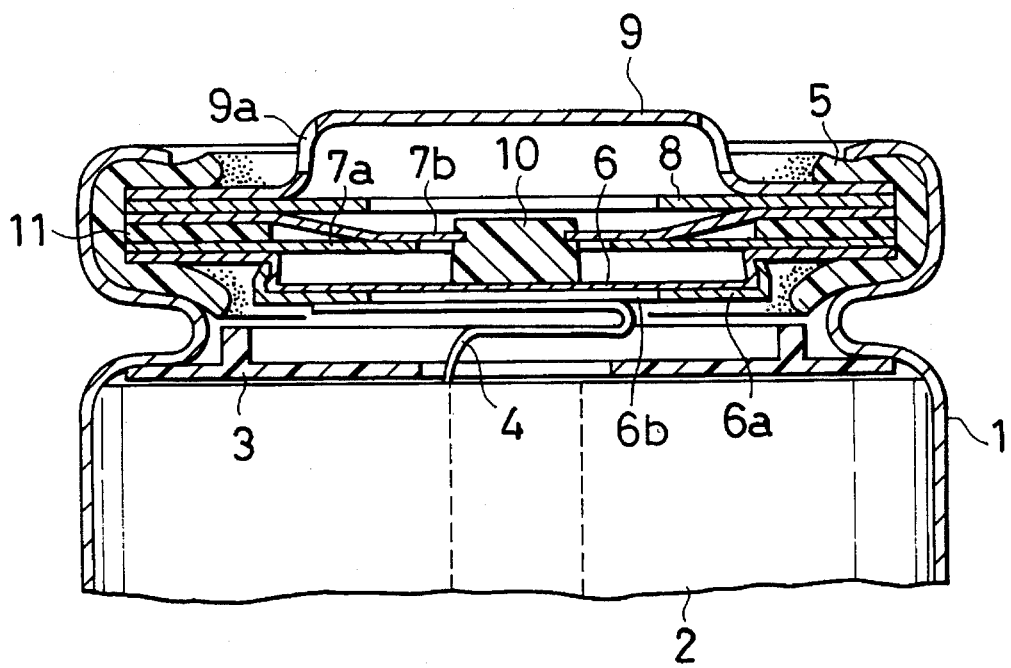
FIG. 3 is a vertical cross sectional view schematically showing the principal part of an embodiment (Cell 2) of the enclosed type non-aqueous secondary cell according to the present invention.
Figure 4:
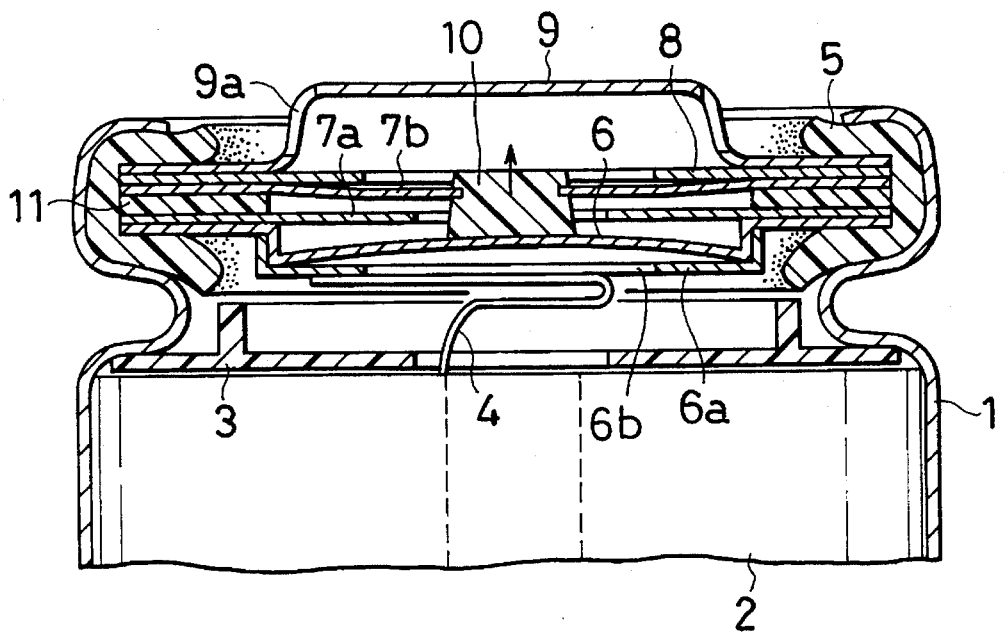
FIG. 4 is a vertical cross sectional view schematically showing the principal part of the embodiment of the enclosed type non-aqueous secondary cell shown in FIG. 3, in the current-cutoff state.

As shwon in FIG. 3, an explosion-proof valve 6 provided with shallow grooves was produced by fitting a valve body, which was a dish-like body of aluminum having a stepped portion protruded towards an electrode group 2 in the vicinity of the outer periphery and groove-like thin portions on the flat portion at the center, in a dish-like lid body 6a of aluminum having central vent holes 6b at the stepped portion of the valve body 6 from the side of the electrode group 2. A switch for current-cutoff was formed by arranging and laminating a first conductive body 7a, an insulating plate 11, a second conductive body 7b, in which a working body 10 is fitted at the central portion, and a PTC element 8 in this order from the side of the explosion-proof valve 6. In this respect, the first conductive body 7a has a ring-like shape provided with a through hole at the center and comes in contact with the outer periphery of the explosion-proof valve 6 at the outer periphery of the body to thus ensure electrical connection therebetween. The second conductive body 7b likewise has a ring-like shape, has a support portion 14 in which the working body 10 is fitted, comes in contact with the PTC element 8 at the outer periphery to ensure electrical connection and is electrically connected to the first conductive body 7a at the support portion. Moreover, the working body 10 consists of an insulating resin, is supported by the second conductive body 7b and arranged in such a manner that it passes through the through hole of the first conductive body 7a and approaches or comes in contact with the valve body 6. In addition, the insulating plate 11 has a ring-like shape and insulates the first conductive body 7a from the second conductive body 7b at the outer periphery thereof. The terminal cap 9 provided with vent holes 9a is the same as that used in Cell 1 and comes in contact with the second conductive body 7b at the outer periphery to ensure the electrical connection therebetween. In this Example, the foregoing first and second conductive bodies 7a and 7b used were produced from a nickel-plated steel plate. The cell provided with the closing lid thus produced is referred to as Cell 2.

(Cell 3)

Figure 5:
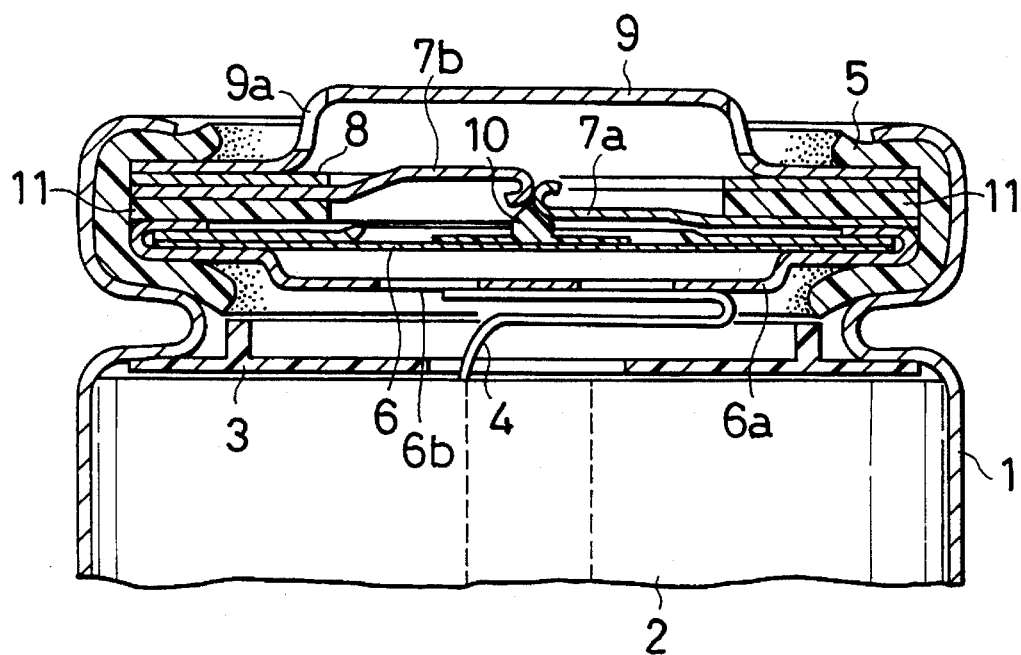
FIG. 5 is a vertical cross sectional view schematically showing the principal part of an embodiment (Cell 3) of the enclosed type non-aqueous secondary cell according to the present invention.
Figure 6:
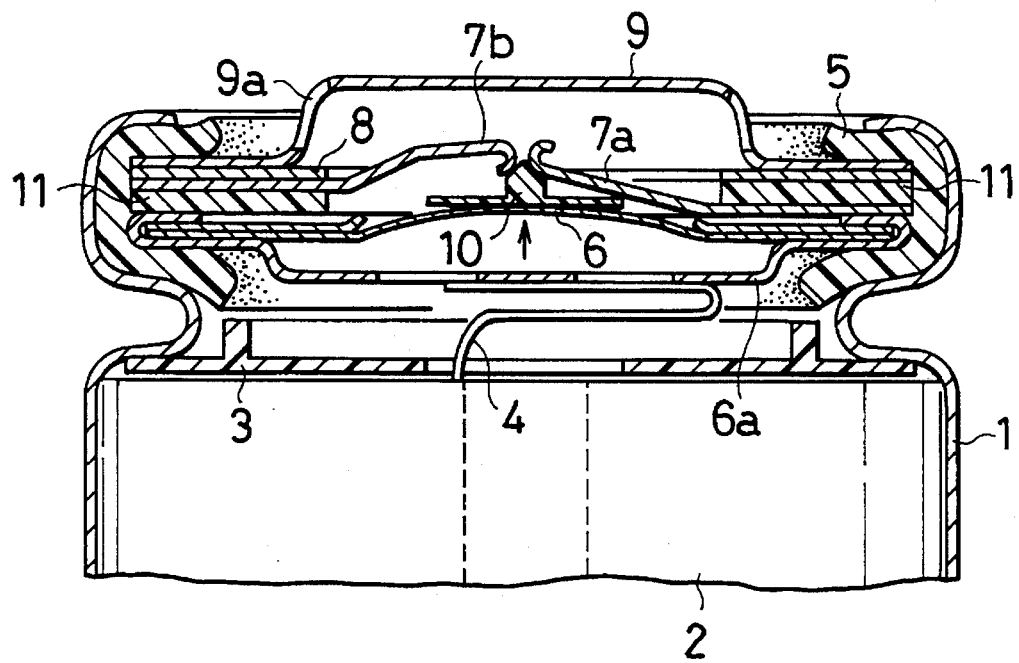
FIG. 6 is a vertical cross sectional view schematically showing the principal part of the embodiment of the enclosed type non-aqueous secondary cell shown in FIG. 5, in the current-cutoff state.

As shwon in FIG. 5, an explosion-proof valve 6 used herein was the same as that used in Cell 1, a switch for current-cutoff was formed by arranging and laminating a working body 10, an insulating material 11 supporting a first conductive body 7a on the side facing an electrode group 2 and a second conductive body 7b on the opposite side and a PTC element 8 in this order from the side of an explosion-proof valve 6. The first and second conductive bodies 7a and 7b are in band-like forms, the tips thereof are shaped through folding and the folded portions come in contact with one another to ensure electrical connection therebetween. Moreover, the insulating material 11 is in a ring-like form having vent holes 6b at the central portion and insulates the first conductive body 7a from the second conductive body 7b at the outer periphery thereof. Moreover, the working body 10 consists of an insulating resin and is arranged between the contact and conductive portion of the first and second conductive bodies 7a and 7b and the valve body. A terminal cap 9 provided with vent holes 9a used herein was the same as that used in Cell 1 and comes in contact with the PTC element 8 at the peripheral portion to thus ensure electrical connection therebetween. In this Example, the foregoing first and second conductive bodies 7a and 7b used were produced from a nickel-plated steel plate. The cell provided with the closing lid thus produced is referred to as Cell 3.

(Cell 4)

Figure 7:
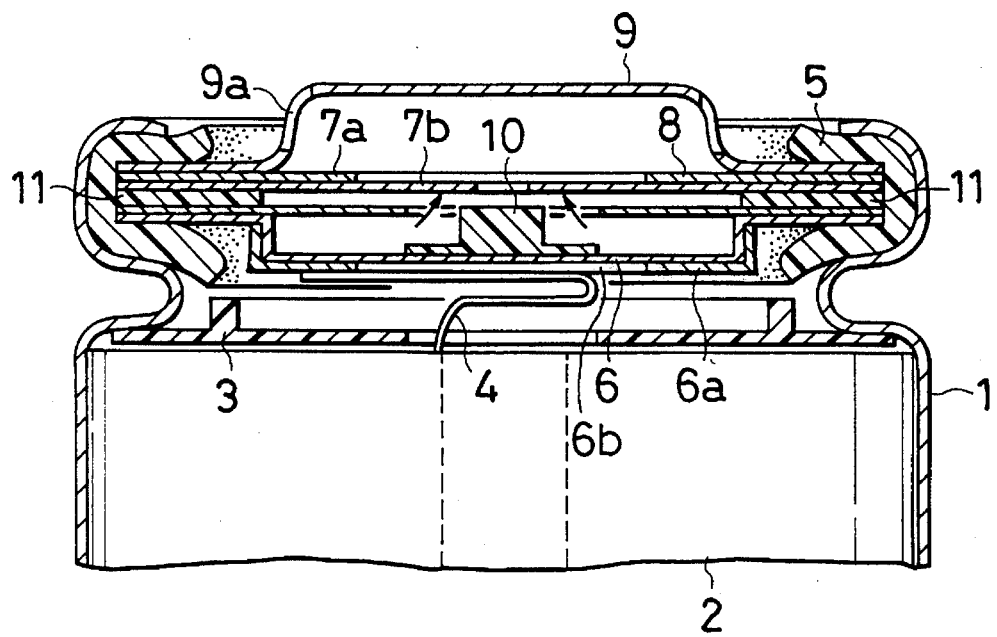
FIG. 7 is a vertical cross sectional view schematically showing the principal part of an embodiment (Cell 4) of the enclosed type non-aqueous secondary cell according to the present invention, which is in the current-cutoff state (when the cell temperature increases).

A cell having a structure approximately identical to that of Cell 2 except that the second conductive body 7b was formed from a band-like shape memory alloy as shown in FIG. 7. The cell thus obtained is referred to as Cell 4.

(Cell 5)

Figure 8:
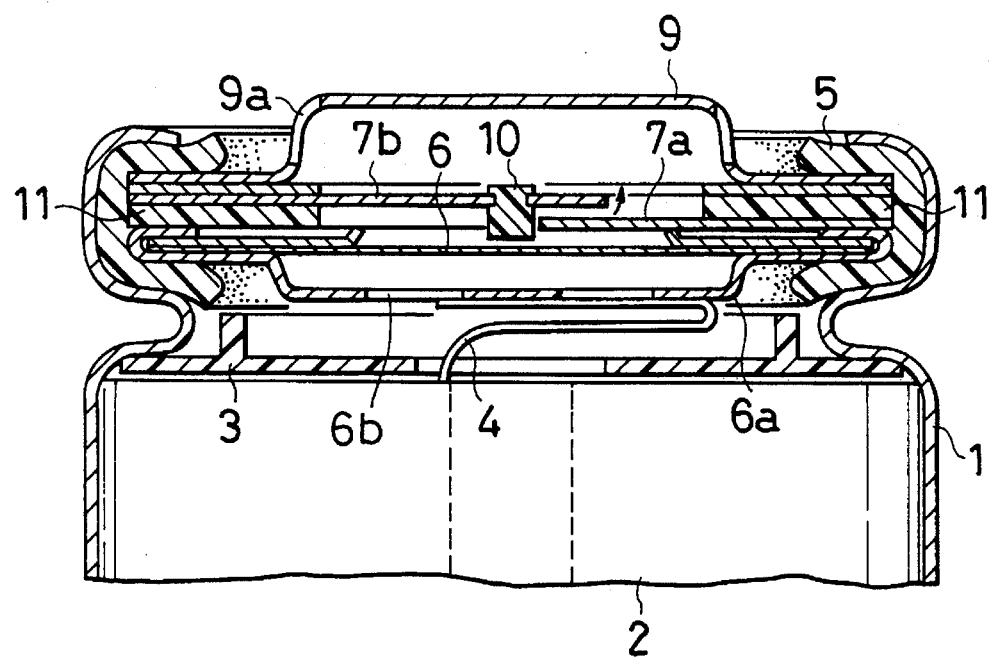
FIG. 8 is a vertical cross sectional view schematically showing the principal part of an embodiment (Cell 5) of the enclosed type non-aqueous secondary cell according to the present invention, which is in the current-cutoff state (when the cell temperature increases).

A cell was assembled. The cell had a structure approximately identical to that of Cell 3 except that the second conductive body 7b was formed from a band-like shape memory alloy and that the working body 10 was arranged between the second conductive body 7b and the valve body 6 as shown in FIG. 8. The resulting cell is referred to as Cell 5.

(Cell 6)

Figure 9:
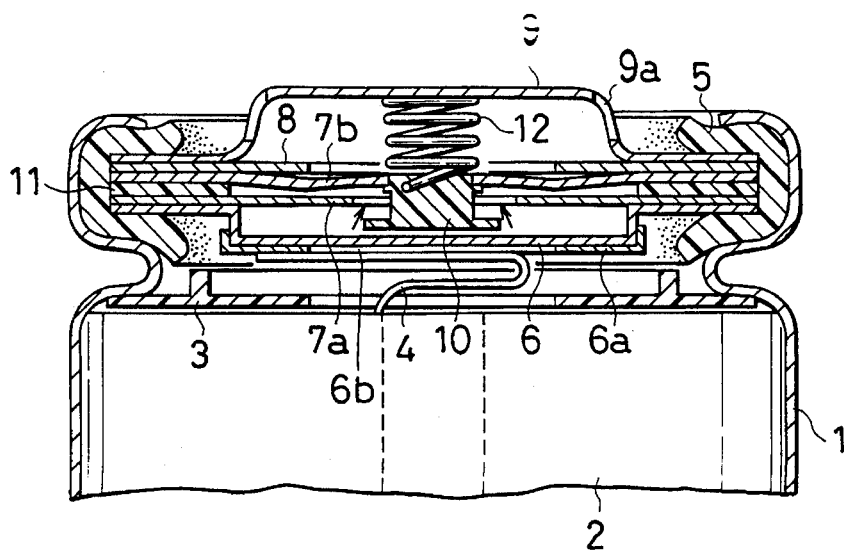
FIG. 9 is a vertical cross sectional view schematically showing the principal part of an embodiment (Cell 6) of the enclosed type non-aqueous secondary cell according to the present invention, which is in the current-cutoff state (when the cell temperature increases).
Figure 10:
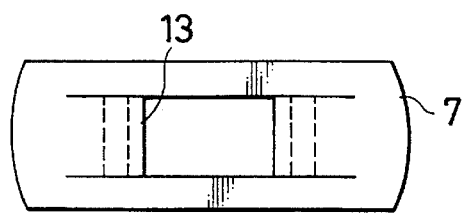
FIG. 10 is a plan view of an embodiment of the conductive body shown in FIG. 1.
Figure 11:
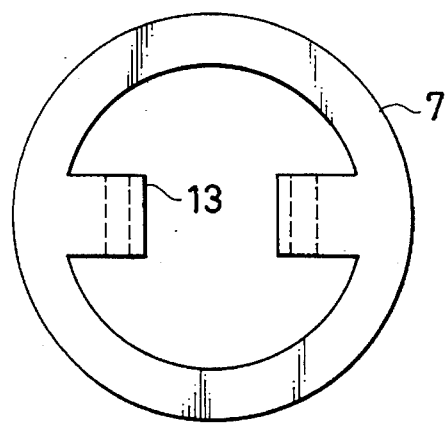
FIG. 11 is a plan view of another embodiment of the conductive body shown in FIG. 1.
Figure 12:
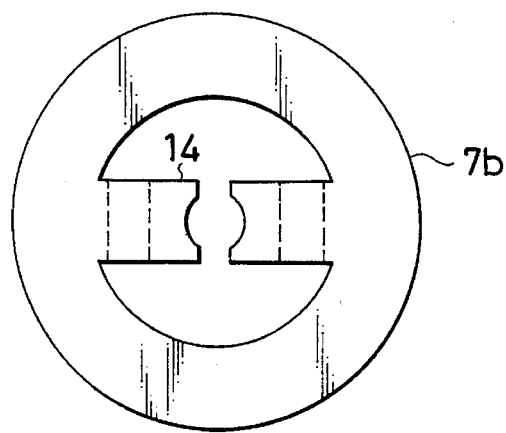
FIG. 12 is a plan view of the second conductive body shown in FIG. 3.
Figure 13:
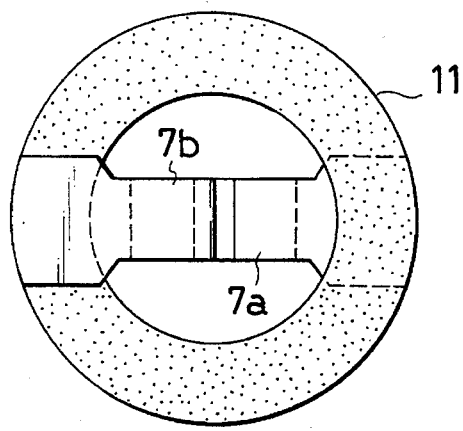
FIG. 13 is a schematic plan view of the principal part of the cell shown in FIG. 5.
Figure 14:
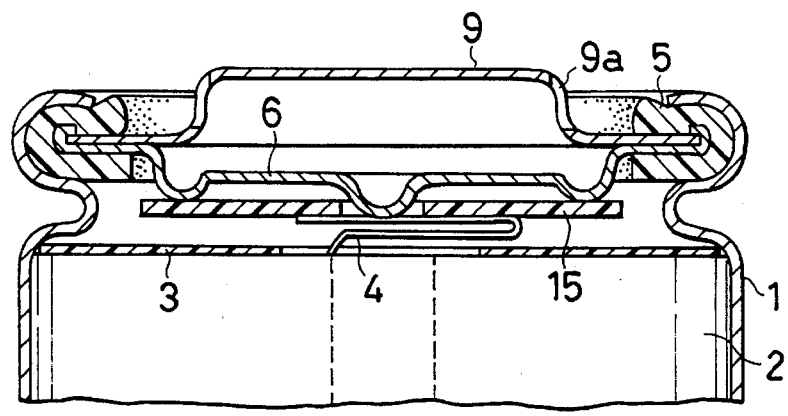
FIG. 14 is a vertical cross sectional view schematically showing the principal part of an embodiment of a conventional enclosed type cell.
Figure 15:
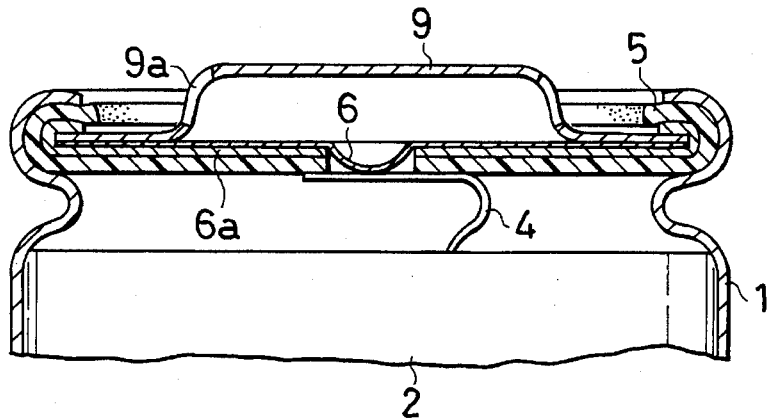
FIG. 15 is a vertical cross sectional view schematically showing the principal part of another embodiment of a conventional enclosed type cell.
Figure 16:
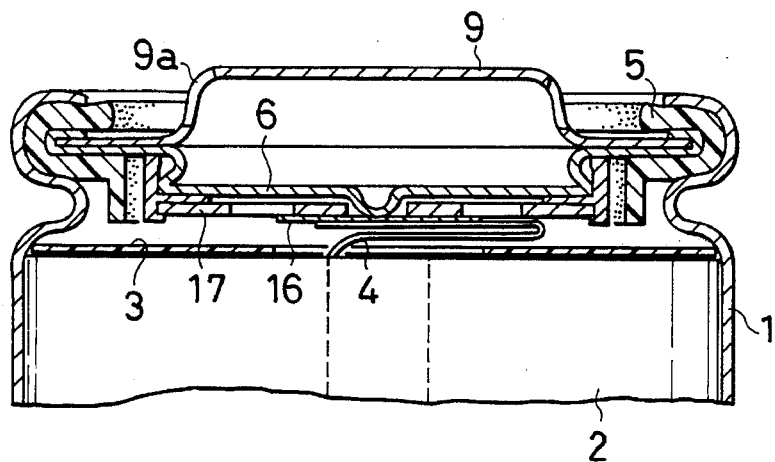
FIG. 16 is a vertical cross sectional view schematically showing the principal part of still another embodiment of a conventional enclosed type cell.
Figure 17:
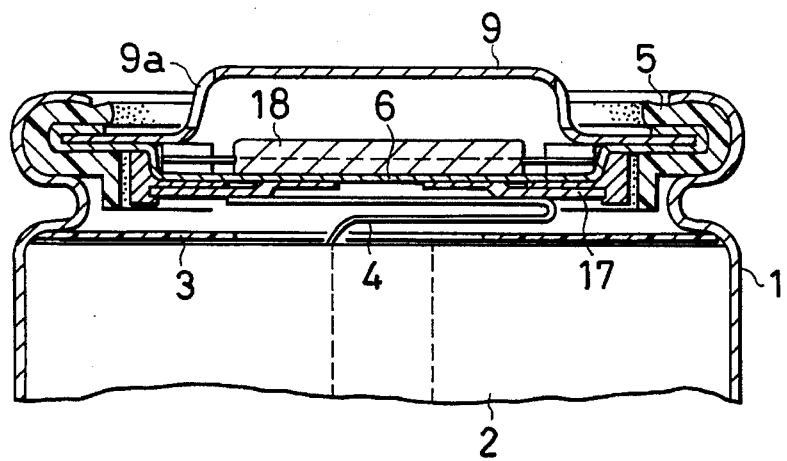
FIG. 17 is a vertical cross sectional view schematically showing the principal part of a further embodiment of a conventional enclosed type cell.
Figure 18:
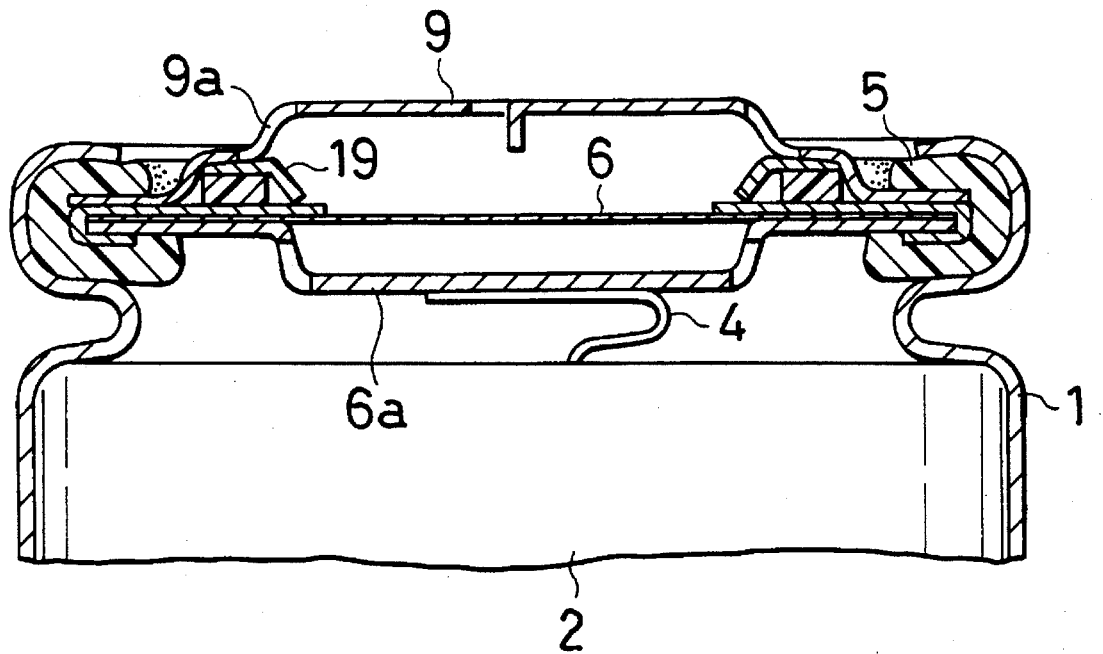
FIG. 18 is a vertical cross sectional view schematically showing the principal part of a still further embodiment of a conventional enclosed type cell.

A cell was assembled. The cell had a structure approximately identical to that of Cell 2 except that a spring 12 comprising a shape memory alloy was arranged between the second conductive body 7b and the terminal cap 9 as shown in FIG. 9. The cell thus produced is referred to as Cell 6.

(Cells 7 to 11)

Conventional cells were produced using, as the foregoing closing lid, that disclosed in J.P. KOKAI No. Hei 2-112151 (Cell 7); that disclosed in Japanese Un-examined Utility Mode 1 Publication No. Hei 5-62956 (Cell 8); that disclosed in J.P. KOKAI No. Hei 5-343043 (Cell 9); that disclosed in J.P. KOKAI No. Hei 5-347154 (Cell 10); and that disclosed in J.P. KOKAI No. Hei 5-205727 (Cell 11).

The cells of the present invention and conventional cells produced above each was subjected, 10 times, to the following cycle comprising completely charging, then storing in an atmosphere of 60° C. and a relative humidity of 90% for 10 days, completely discharging, then repeating charge-discharge operations over 5 times, again completely charging and then storing. Thereafter, each cell was subjected to a test which comprised 3 C continuous overcharge at room temperature (the number of each cell used in the test was set at 20). The results thus obtained are listed in the following Table 1 (each numerical value in Table 1 means a probability of each cell in which the current circuit-cutoff mechanism was normally operated and was not exploded).

TABLE 1

| Cell No. | Before Storage | After Storage |
| --- | --- | --- |
| 1 | 100 | 100 |
| 2 | 100 | 100 |
| 3 | 100 | 100 |
| 4 | 100 | 100 |
| 5 | 100 | 100 |
| 6 | 100 | 100 |
| 7 | 85 | 75 |
| 8 | 95 | 90 |
| 9 | 95 | 90 |
| 10 | 95 | 85 |
| 11 | 40 | 45 |

(unit: %)

As has been discussed above, in all of the enclosed non-aqueous secondary cell of the present invention, the switch for current circuit-cutoff operates with certainty and the cells were not exploded at all. Moreover, the contact type switch was used in the cells produced in Examples of the present invention, but the same results were obtained even when joining the contact switch portion through spot-welding. In addition, the same results were also obtained even when an explosion-proof valve provided with shallow grooves was substituted for the thin film type explosion-proof valve or a thin film type explosion-proof valve was substituted for the explosion-proof valve provided with shallow grooves.

EXAMPLE 2

Examples in which carbonates are used in combination with the positive electrode active materials will be described below.

Preparation of Cell

A slurry for positive electrode was prepared by mixing 92 parts by weight of $LiCoO_2$ as a positive electrode active material and 4 parts by weight of acetylene black as a conductivity-imparting agent, adding 3 parts by weight of polytetrafluoroethylene and one part by weight of sodium polyacrylate as binders and kneading the mixture using water as a medium. The resulting slurry was applied onto both sides of a current collector of an aluminum foil (support) having a thickness of 20 μm. After drying the coated slurry, the collector was compression-molded into band-like positive electrode sheet using a calender press. A lead plate was connected to one end of the positive electrode sheet through spot-welding and then the sheet was heat-treated at 150° C. for 4 hours in a dry air having a dew point of not more than −40° C.

Tin monooxide (13.5 g) and silicon dioxide (6.0 g) were mixed under a dry condition in a ball mill. Then the resulting mixture was introduced into an alumina crucible and the temperature thereof was raised to 1000° C. at a rate of 15° C./min in an argon gas atmosphere. After calcination of the mixture at 1000° C. for 12 hours, the temperature thereof was reduced to room temperature at a rate of 10° C./min in an argon gas atmosphere to give a glass-like desired compound. The compound was roughly pulverized using a jaw crusher, dry-pulverized in a rotary air jet type jet mill at room temperature and then classified with a cyclone to give a negative electrode active material. There were mixed 84 parts by weight of the negative electrode active material, 3 parts by weight of acetylene black and 8 parts by weight of graphite, followed by addition of 4 parts by weight of polyvinylidene fluoride and one part by weight of carboxymethyl cellulose as binders and kneading with water as a medium to give a slurry for negative electrodes. The resulting slurry was applied onto both sides of a copper foil having a thickness of 18 μm using a doctor blade coater. After drying the coated slurry, the copper foil was compression-molded using a calender press, a lead plate was connected to one end of the press-molded foil through spot-welding and then the foil was heat-treated at 150° C. for 4 hours in a dry air having a dew point of not more than −40° C. to give a band-like negative electrode sheet.

The positive electrode sheet produced above, a separator of a microporous polypropylene film (Cell Guard 2400), the negative electrode sheet thus prepared and the same separator were laminated in this order and the laminate was wound into a spiral form.

The wound body was accommodated in a closed-end cylindrical cell-can of nickel-plated iron which also served as a negative terminal. A 1 mol/l $LiPF_6$ solution in a mixed solvent or ethylene carbonate solution/diethyl carbonate (50/50 by volume) was introduced into the can as an electrolyte. A cell-lid provided with a current-cutoff mechanism was calked through a gasket to give a cylindrical cell. In this respect, a positive terminal and the can were, in advance, connected to the positive electrode sheet and negative electrode sheet, respectively, through lead terminals. The cross sectional view of a part of the cylindrical cell is shown in FIG. 3.

The cell thus produced was subjected to charge-discharge cycle 3 times at a final charge voltage of 4.2 V, a final discharge voltage of 2.8 V and a current density of 2.5 mA/cm² to give an active cell.

The resulting cell had a diameter of 18 mm and a height of 65 min.

EXAMPLE 3

Non-aqueous secondary cells were produced by repeating the same procedures used in the foregoing "Preparation of Cell" except that the following carbonates were mixed with the positive electrode active material and the conductivity-imparting agent when preparing slurries for positive electrodes.

TABLE 2

| Cell No. | Name of Chemical | Added Amount (part by weight)* |
|---|---|---|
| 001 | sodium carbonate | 0.10 |
| 002 | sodium carbonate | 0.30 |
| 003 | sodium carbonate | 0.50 |
| 004 | sodium carbonate | 1.00 |
| 005 | sodium carbonate | 3.00 |
| 006 | sodium carbonate | 4.00 |
| 007 | sodium carbonate | 5.00 |
| 008 | calcium carbonate | 0.50 |
| 009 | calcium carbonate | 1.00 |
| 010 | calcium carbonate | 1.50 |
| 011 | calcium carbonate | 6.00 |
| 012 | calcium carbonate | 15.00 |
| 013 | calcium carbonate | 20.00 |
| 014 | calcium carbonate | 25.00 |
| 015 | sodium hydrogen carbonate | 0.10 |
| 016 | sodium hydrogen carbonate | 0.50 |
| 017 | sodium hydrogen carbonate | 1.00 |
| 018 | Potassium carbonate | 0.10 |
| 019 | Potassium carbonate | 0.50 |
| 020 | Potassium carbonate | 1.00 |
| 021 | Potassium hydrogen carbonate | 0.10 |
| 022 | potassium hydrogen carbonate | 0.50 |
| 023 | potassium hydrogen carbonate | 1.00 |
| 024 | rubidium carbonate | 0.10 |
| 025 | rubidium carbonate | 0.50 |
| 026 | rubidium carbonate | 1.00 |
| 027 | magnesium carbonate | 0.50 |
| 028 | magnesium carbonate | 1.50 |
| 029 | magnesium carbonate | 6.00 |
| 030 | barium carbonate | 0.50 |
| 031 | barium carbonate | 1.50 |
| 032 | barium carbonate | 6.00 |

*The amount of the chemical per 100 parts by weight of the positive electrode active material.

COMPARATIVE EXAMPLE 1

Non-aqueous secondary cells were produced by repeating the same procedures used in the foregoing "Preparation of Cell" except that the following carbonates were mixed with the positive electrode active material and the conductivity-imparting agent when preparing slurries for positive electrodes.

TABLE 3

| Cell No. | Name of Chemical | Added Amount (part by weight)* |
|---|---|---|
| 033 | None | |
| 034 | sodium carbonate | 0.05 |
| 035 | sodium carbonate | 6.00 |
| 036 | sodium carbonate | 15.00 |
| 037 | calcium carbonate | 0.10 |
| 038 | calcium carbonate | 30.00 |
| 039 | lithium carbonate | 0.50 |
| 040 | lithium carbonate | 1.00 |
| 041 | lithium carbonate | 5.00 |
| 042 | lithium carbonate | 6.00 |
| 043 | lithium carbonate | 10.00 |
| 044 | lithium carbonate | 15.00 |
| 045 | iron carbonate | 6.00 |

*The amount of the chemical per 100 parts by weight of positive electrode active material.

TEST EXAMPLE 1

The foregoing cells (20 cells each) were produced and positive electrode breakage failure was examined and expressed in terms of the frequency of failure (%) (i.e., the rate of cells which were not operated as normal cells due to breakage of the positive electrodes during production of these cells or during charging the same, out of the 20 cells produced).

TABLE 4

| Cell No. | frequency of failure | Cell No. | frequency of failure |
| --- | --- | --- | --- |
| 001 | 0 | 002 | 0 |
| 003 | 0 | 004 | 5 |
| 005 | 5 | 006 | 5 |
| 007 | 5 | 008 | 0 |
| 009 | 0 | 010 | 0 |
| 011 | 0 | 012 | 0 |
| 013 | 0 | 014 | 0 |
| 015 | 0 | 016 | 0 |
| 017 | 0 | 018 | 0 |
| 019 | 0 | 020 | 5 |
| 021 | 0 | 022 | 0 |
| 023 | 0 | 024 | 0 |
| 025 | 0 | 026 | 5 |
| 027 | 0 | 028 | 0 |
| 029 | 0 | 030 | 0 |
| 031 | 0 | 032 | 0 |
| 033 | 0 | 034 | 0 |
| 035 | 15 | 036 | 90 |
| 037 | 0 | 038 | 15 |
| 039 | 0 | 040 | 5 |
| 041 | 10 | 042 | 15 |
| 043 | 15 | 044 | 25 |
| 045 | 0 | | |

(unit: %)

TEST EXAMPLE 2

These cells were subjected to overcharge tests at a charging current of 1 A, 3 A and 5 A. Each cell (5 cells each) was used in the test and the number of damaged cells was determined. The results are listed in the following Table 5.

TABLE 5

| | Charging Current During Overcharge | | |
| --- | --- | --- | --- |
| Cell No. | 1A | 3A | 5A |
| 001 | 0 | 2 | 4 |
| 002 | 0 | 0 | 2 |
| 003 | 0 | 0 | 0 |
| 004 | 0 | 0 | 0 |
| 005 | 0 | 0 | 0 |
| 006 | 0 | 0 | 1 |
| 007 | 0 | 0 | 1 |
| 008 | 0 | 2 | 4 |
| 009 | 0 | 1 | 3 |
| 010 | 0 | 0 | 2 |
| 011 | 0 | 0 | 1 |
| 012 | 0 | 0 | 1 |
| 013 | 0 | 0 | 2 |
| 014 | 0 | 1 | 2 |
| 015 | 0 | 2 | 3 |
| 016 | 0 | 0 | 0 |
| 017 | 0 | 0 | 0 |
| 018 | 0 | 2 | 4 |
| 019 | 0 | 0 | 1 |
| 020 | 0 | 0 | 1 |
| 021 | 0 | 2 | 3 |
| 022 | 0 | 0 | 1 |
| 023 | 0 | 0 | 1 |
| 024 | 0 | 2 | 5 |
| 025 | 0 | 1 | 2 |
| 026 | 0 | 0 | 2 |
| 027 | 0 | 2 | 4 |
| 028 | 0 | 0 | 2 |
| 029 | 0 | 0 | 1 |
| 030 | 1 | 3 | 5 |
| 031 | 0 | 1 | 2 |
| 032 | 0 | 0 | 2 |
| 033 | 5 | 5 | 5 |
| 034 | 5 | 5 | 5 |

TABLE 5-continued

| | Charging Current During Overcharge | | |
| --- | --- | --- | --- |
| Cell No. | 1A | 3A | 5A |
| 035 | 0 | 0 | 1 |
| 036 | (cells could not be produced) | | |
| 037 | 3 | 4 | 5 |
| 038 | 0 | 1 | 2 |
| 039 | 0 | 5 | 5 |
| 040 | 0 | 5 | 5 |
| 041 | 0 | 4 | 5 |
| 042 | 0 | 3 | 4 |
| 043 | 0 | 1 | 2 |
| 044 | 0 | 0 | 1 |
| 045 | 2 | 5 | 5 |

TEST EXAMPLE 3

The capacity of these cells were examined by first charging at a charging current of 1 A till the voltage reached 4.25 V and then discharging at a current of 1 A till the voltage reached 2.7 V. The results are listed in the following Table 6, in terms of the capacity relative to that observed for Cell No. 033 (which was assumed to be 100).

TABLE 6

| Cell No. | Relative Capacity | Cell No. | Relative Capacity |
| --- | --- | --- | --- |
| 001 | 100 | 002 | 100 |
| 003 | 100 | 004 | 99 |
| 005 | 98 | 006 | 98 |
| 007 | 97 | 008 | 100 |
| 009 | 99 | 010 | 99 |
| 011 | 97 | 012 | 93 |
| 013 | 91 | 014 | 88 |
| 015 | 100 | 016 | 99 |
| 017 | 99 | 018 | 100 |
| 019 | 100 | 020 | 100 |
| 021 | 100 | 022 | 100 |
| 023 | 100 | 024 | 100 |
| 025 | 100 | 026 | 99 |
| 027 | 100 | 028 | 99 |
| 029 | 97 | 030 | 100 |
| 031 | 99 | 032 | 97 |
| 033 | 100 | 034 | 100 |
| 035 | 96 | 036 | 92 |
| 037 | 99 | 038 | 85 |
| 039 | 98 | 040 | 97 |
| 041 | 98 | 042 | 97 |
| 043 | 95 | 044 | 92 |
| 045 | 97 | | |

EXAMPLE 4

Cells were prepared by repeating the same procedures used in Example 3 except that petroleum pitch coke was used as the negative electrode active material.

TABLE 7

| Cell No. | Name of Chemical | Added Amount (part by weight)* |
| --- | --- | --- |
| 046 | sodium carbonate | 0.50 |
| 047 | sodium carbonate | 1.00 |
| 048 | sodium carbonate | 5.00 |

*The amount of the chemical per 100 parts by weight of the positive electrode active material.

COMPARATIVE EXAMPLE 2

A comparative cell (Cell No. 049) was prepared using petroleum pitch coke as the negative electrode active material, while addition of carbonate was omitted.

TEST EXAMPLE 4

The foregoing cells (20 cells each) were produced and positive electrode breakage failure was examined and expressed in terms of the frequency of failure (%) (i.e., the rate of cells which were not operated as normal cells due to breakage of the positive electrodes during production of these cells or during charging the same, out of the 20 cells produced).

TABLE 8

| Cell No. | Frequency of Failure (%) |
| --- | --- |
| 046 | 0 |
| 047 | 5 |
| 048 | 5 |
| 049 | 5 |

TEST EXAMPLE 5

These cells were subjected to overcharge tests at a charging current of 1 A, 3 A and 5 A. Each cell (5 cells each) was used in the test and the number of damaged cells was determined. The results are listed in the following Table 9.

TABLE 9

| Cell No. | Charging Current During Overcharge | | |
| --- | --- | --- | --- |
| | 1A | 3A | 5A |
| 046 | 0 | 0 | 0 |
| 047 | 0 | 0 | 0 |
| 048 | 0 | 0 | 1 |
| 049 | 0 | 0 | 1 |

TEST EXAMPLE 6

The capacity of these cells were examined by first charging at a charging current of 1 A till the voltage reached 4.35 V and then discharging at a current of 1 A till the voltage reached 2.7 V. The results are listed in the following Table 10, in terms of the capacity relative to that observed for Cell No. 049 (which was assumed to be 100).

TABLE 10

| Cell No. | Relative Capacity |
| --- | --- |
| 046 | 89 |
| 047 | 86 |
| 048 | 80 |
| 049 | 100 |

As has been discussed above, the cell of the present invention in which a carbonate is simultaneously used rarely cause positive electrode breakage failure and has improved safety during overcharge at a large charging current.

The enclosed type non-aqueous secondary cell of the present invention is provided with a non-reverse type switch for current-cutoff positioned between the explosion-proof valve and the terminal cap and does not have a structure in which the switch is not directly welded to the valve body undergoing deformation when the internal pressure of the cell increases. Therefore, the cell permits shutting off of the electrical connection within the cell with certainty at the initial stage of an increase in the cell temperature or internal pressure of the cell encountered when abnormality such as overcharge or short occurs. Moreover, the switch for current-cutoff can be formed independent of the explosion-proof valve. Accordingly, the cutoff function thereof can be confirmed prior to the incorporation thereof into the cell and thus the present invention can provide an enclosed type non-aqueous secondary cell having high reliability and high safety.

Furthermore the current-cutoff effect can be improved through the use of a carbonate in combination with a positive electrode active material.

What is claimed is:

1. An enclosed non-aqueous secondary cell in which a group of electrodes comprising positive and negative electrodes allowing absorption and release of a light metal and separators are accommodated in a closed-end cell-armoring can together with a non-aqueous electrolyte and an opening of the armoring can is closed by an insulating gasket positioned around the inner periphery of the opening of the can and a closing lid fitted in and supported by the gasket and simultaneously serving as a positive or negative terminal, wherein:

the closing lid comprises an explosion-proof valve capable of deforming towards the direction opposite to the group of electrodes in response to an increase in the internal pressure of the cell, a terminal cap provided with vent holes and arranged at the side of the explosion-proof valve opposed to the group of electrodes and a switch which is not reversible and which is positioned between the explosion-proof valve and the terminal cap and serves to shut-off the electrical connection between the terminal cap and the positive or negative electrode when the temperature of the cell is raised or the internal pressure of the cell is increased.

2. The enclosed non-aqueous secondary cell of claim 1 wherein the switch comprises a conductor consisting essentially of a shape memory alloy.

3. The enclosed non-aqueous secondary cell of claim 1 wherein said switch which is not reversible is one with a contact electrical connection system in which the connected portion is separated in its operating condition.

4. The enclosed non-aqueous secondary cell of claim 1 wherein said switch Which is not reversible is one with a welded electrical connection system in which the welded portion is broken or peeled off in its operating condition.

5. The enclosed non-aqueous secondary cell of claim 1 wherein said switch which is not reversible is a caulking switch in which electrical connection is made by a caulked portion.

6. The enclosed non-aqueous secondary cell of claim 1 wherein said switch which is not reversible is one comprising a plate, rod or linear electrically connected portion in which the electrically connected portion is cut.

7. The enclosed non-aqueous secondary cell of claim 1 wherein said switch which is not reversible is a pressure-contact switch which makes use of a plate spring or a spiral spring.

8. The enclosed non-aqueous secondary cell of claim 1 wherein said switch which is not reversible is a welded switch in which a part of a plate spring is connected to the explosion-proof valve through welding.

9. The non-aqueous secondary cell of claim 1 wherein the positive electrode's active material incorporates sodium and/or potassium and/or rubidium and/or magnesium and/or calcium and/or barium salts of carbonic acid.

10. The non-aqueous secondary cell of claim 9 wherein the positive electrode's active material incorporates sodium and/or potassium and/or rubidium salts of carbonic acid in an amount of not less than 0.1% by weight and not more than 5% by weight on the basis of the weight of the active material and/or the positive electrode active material is used in combination with magnesium and/or calcium and/or barium salts of carbonic acid in an amount of not less than 0.5% by weight and not more than 25% by weight on the basis of the weight of the active material.

* * * * *